US012574888B2

(12) United States Patent
Säily et al.

(10) Patent No.: US 12,574,888 B2
(45) Date of Patent: Mar. 10, 2026

(54) REQUEST PROCEDURE FOR POSITIONING REFERENCE SIGNALS FOR WIRELESS NETWORKS

(71) Applicant: NOKIA TECHNOLOGIES OY, Espoo (FI)

(72) Inventors: Mikko Säily, Laukkoski (FI); Timo Koskela, Oulu (FI); Risto Ilari Wichman, Helsinki (FI)

(73) Assignee: Nokia Technologies Oy, Espoo (FI)

( * ) Notice: Subject to any disclaimer, the term of this patent is extended or adjusted under 35 U.S.C. 154(b) by 364 days.

(21) Appl. No.: 18/246,302

(22) PCT Filed: Oct. 7, 2020

(86) PCT No.: PCT/EP2020/078074
§ 371 (c)(1),
(2) Date: Mar. 22, 2023

(87) PCT Pub. No.: WO2022/073598
PCT Pub. Date: Apr. 14, 2022

(65) Prior Publication Data
US 2023/0379865 A1 Nov. 23, 2023

(51) Int. Cl.
*H04W 64/00* (2009.01)
*H04L 5/00* (2006.01)

(52) U.S. Cl.
CPC .............. *H04W 64/00* (2013.01); *H04L 5/005* (2013.01)

(58) Field of Classification Search
CPC ................................ H04W 64/00; H04L 5/005
See application file for complete search history.

(56) References Cited

U.S. PATENT DOCUMENTS

| | | | |
|---|---|---|---|
| 10,420,063 B2 | 9/2019 | Ly | |
| 2020/0028648 A1 | 1/2020 | Akkarakaran et al. | |
| 2020/0092917 A1 | 3/2020 | Akkarakaran et al. | |
| 2022/0167301 A1* | 5/2022 | Goyal | H04L 5/0048 |

OTHER PUBLICATIONS

International Search Report and Written Opinion for International Application No. PCT/EP2020/078074, mailed on Jul. 2, 2021, 15 pages.

* cited by examiner

*Primary Examiner* — Vladimir Magloire
(74) *Attorney, Agent, or Firm* — Lippes Mathias LLP

(57) ABSTRACT

A method may include determining, by a user device, an identifier to be used in a random access procedure to indicate a request for a positioning reference signal; selecting, by the user device, a downlink reference signal among a plurality of downlink reference signals received from a network node; controlling sending, by the user device to the network node, as part of a random access procedure, a random access preamble via a random access resource associated with the selected downlink reference signal, and the determined identifier; controlling receiving, by the user device from the network node, the requested positioning reference signal; and carrying out a positioning procedure using the requested positioning reference signal.

17 Claims, 8 Drawing Sheets

Example Wireless Network 130

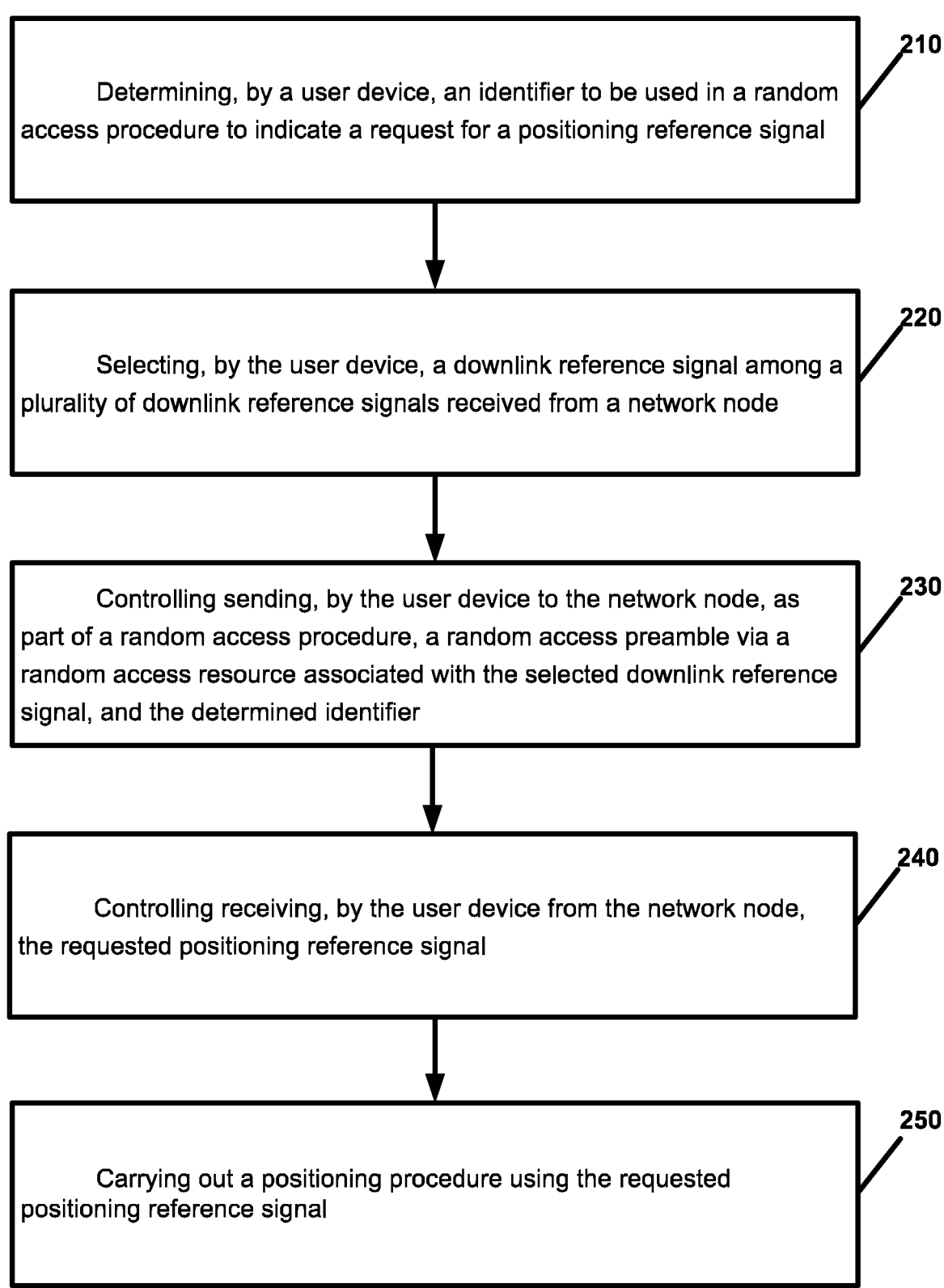

Determining, by a user device, an identifier to be used in a random access procedure to indicate a request for a positioning reference signal

210

Selecting, by the user device, a downlink reference signal among a plurality of downlink reference signals received from a network node

220

Controlling sending, by the user device to the network node, as part of a random access procedure, a random access preamble via a random access resource associated with the selected downlink reference signal, and the determined identifier

230

Controlling receiving, by the user device from the network node, the requested positioning reference signal

240

Carrying out a positioning procedure using the requested positioning reference signal

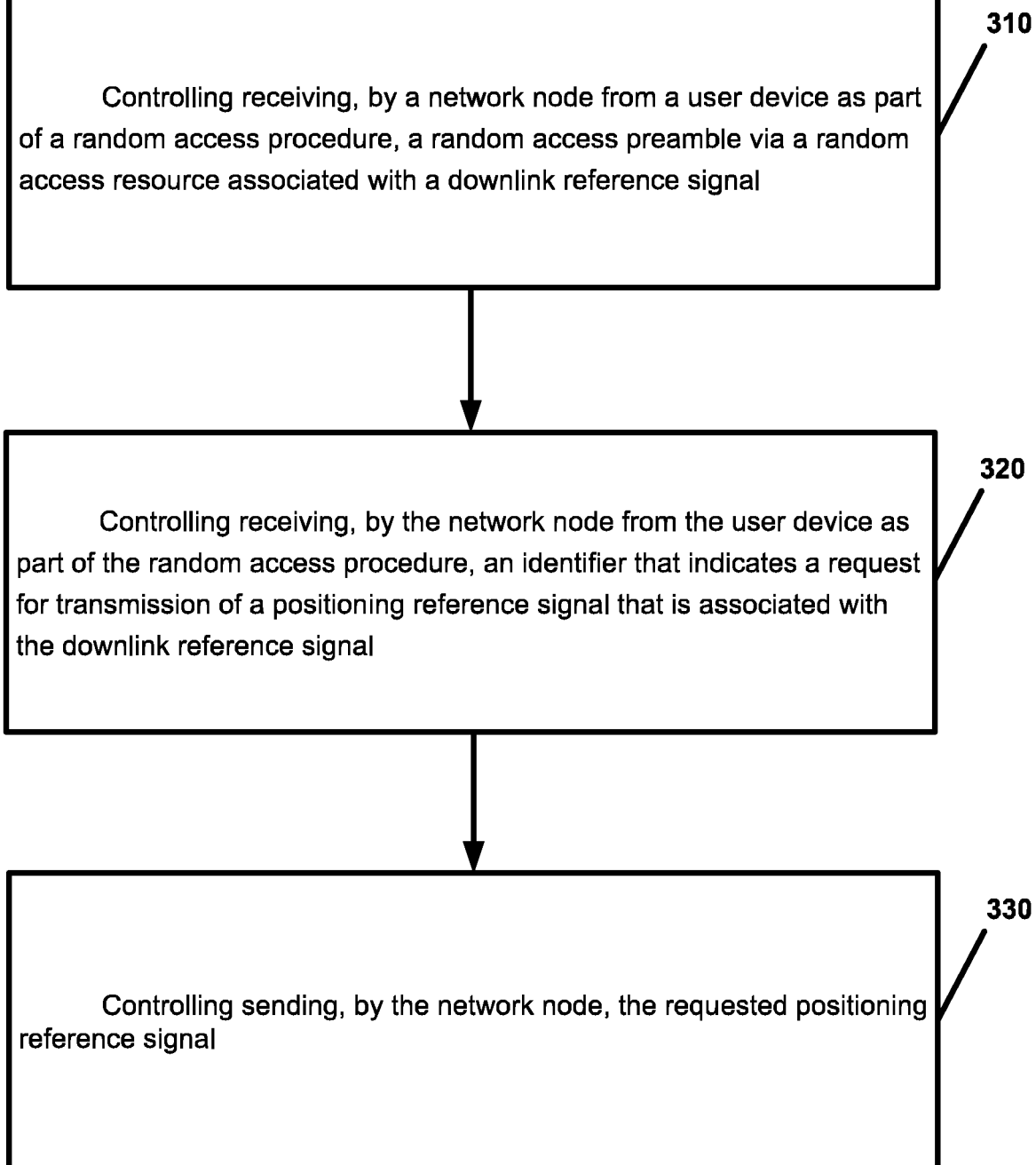

310

Controlling receiving, by a network node from a user device as part of a random access procedure, a random access preamble via a random access resource associated with a downlink reference signal

320

Controlling receiving, by the network node from the user device as part of the random access procedure, an identifier that indicates a request for transmission of a positioning reference signal that is associated with the downlink reference signal

330

Controlling sending, by the network node, the requested positioning reference signal

FIG. 3

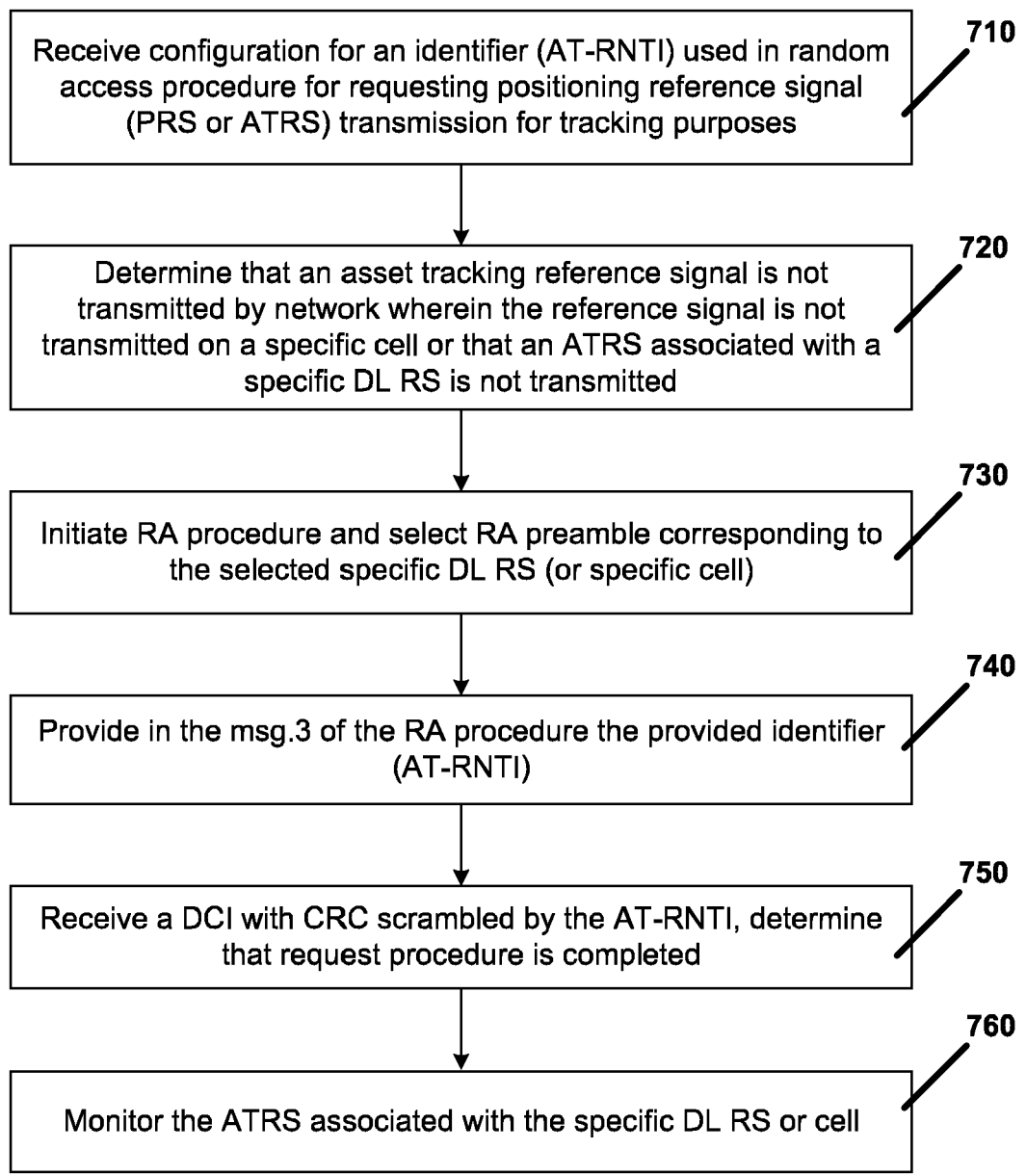

Receive configuration for an identifier (AT-RNTI) used in random access procedure for requesting positioning reference signal (PRS or ATRS) transmission for tracking purposes — 710

Determine that an asset tracking reference signal is not transmitted by network wherein the reference signal is not transmitted on a specific cell or that an ATRS associated with a specific DL RS is not transmitted — 720

Initiate RA procedure and select RA preamble corresponding to the selected specific DL RS (or specific cell) — 730

Provide in the msg.3 of the RA procedure the provided identifier (AT-RNTI) — 740

Receive a DCI with CRC scrambled by the AT-RNTI, determine that request procedure is completed — 750

Monitor the ATRS associated with the specific DL RS or cell — 760

FIG. 7

REQUEST PROCEDURE FOR POSITIONING REFERENCE SIGNALS FOR WIRELESS NETWORKS

CROSS-REFERENCE TO RELATED APPLICATIONS

This application is a national stage entry of International Application No. PCT/EP2020/078074, filed Oct. 7, 2020, entitled "REQUEST PROCEDURE FOR POSITIONING REFERENCE SIGNALS FOR WIRELESS NETWORKS" which is hereby incorporated by reference in its entirety.

TECHNICAL FIELD

This description relates to wireless communications.

BACKGROUND

A communication system may be a facility that enables communication between two or more nodes or devices, such as fixed or mobile communication devices. Signals can be carried on wired or wireless carriers.

An example of a cellular communication system is an architecture that is being standardized by the $3^{rd}$ Generation Partnership Project (3GPP). A recent development in this field is often referred to as the long-term evolution (LTE) of the Universal Mobile Telecommunications System (UMTS) radio-access technology. E-UTRA (evolved UNITS Terrestrial Radio Access) is the air interface of 3GPP's Long Term Evolution (LTE) upgrade path for mobile networks. In LTE, base stations or access points (APs), which are referred to as enhanced Node AP (eNBs), provide wireless access within a coverage area or cell. In LTE, mobile devices, or mobile stations are referred to as user equipments (UE). LTE has included a number of improvements or developments. Aspects of LTE are also continuing to improve.

5G New Radio (NR) development is part of a continued mobile broadband evolution process to meet the requirements of 5G, similar to earlier evolution of 3G & 4G wireless networks. In addition, 5G is also targeted at the new emerging use cases in addition to mobile broadband. A goal of 5G is to provide significant improvement in wireless performance, which may include new levels of data rate, latency, reliability, and security. 5G NR may also scale to efficiently connect the massive Internet of Things (IoT) and may offer new types of mission-critical services. For example, ultra-reliable and low-latency communications (URLLC) devices may require high reliability and very low latency.

SUMMARY

According to an example embodiment, a method may include: determining, by a user device, an identifier to be used in a random access procedure to indicate a request for a positioning reference signal; selecting, by the user device, a downlink reference signal among a plurality of downlink reference signals received from a network node; controlling sending, by the user device to the network node, as part of a random access procedure, a random access preamble via a random access resource associated with the selected downlink reference signal, and the determined identifier; controlling receiving, by the user device from the network node, the requested positioning reference signal; and carrying out a positioning procedure using the requested positioning reference signal.

According to an example embodiment, a method may include: controlling receiving, by a network node from a user device as part of a random access procedure, a random access preamble via a random access resource associated with a downlink reference signal; controlling receiving, by the network node from the user device as part of the random access procedure, an identifier that indicates a request for transmission of a positioning reference signal that is associated with the downlink reference signal; and controlling sending, by the network node, the requested positioning reference signal.

Other example embodiments are provided or described for each of the example methods, including: means for performing any of the example methods; a non-transitory computer-readable storage medium comprising instructions stored thereon that, when executed by at least one processor, are configured to cause a computing system to perform any of the example methods; and an apparatus including at least one processor, and at least one memory including computer program code, the at least one memory and the computer program code configured to, with the at least one processor, cause the apparatus at least to perform any of the example methods.

The details of one or more examples of embodiments are set forth in the accompanying drawings and the description below. Other features will be apparent from the description and drawings, and from the claims.

BRIEF DESCRIPTION OF THE DRAWINGS

FIG. 2 is a flow chart illustrating operation of a user device (or UE).

FIG. 3 is a flow chart illustrating operation of a network node (e.g., BS, gNB, DU, or other network node).

FIG. 7 is a flow chart illustrating one or more operations of a user device (or UE) described in the method of FIG. 2 may perform.

DETAILED DESCRIPTION

Figure 1:
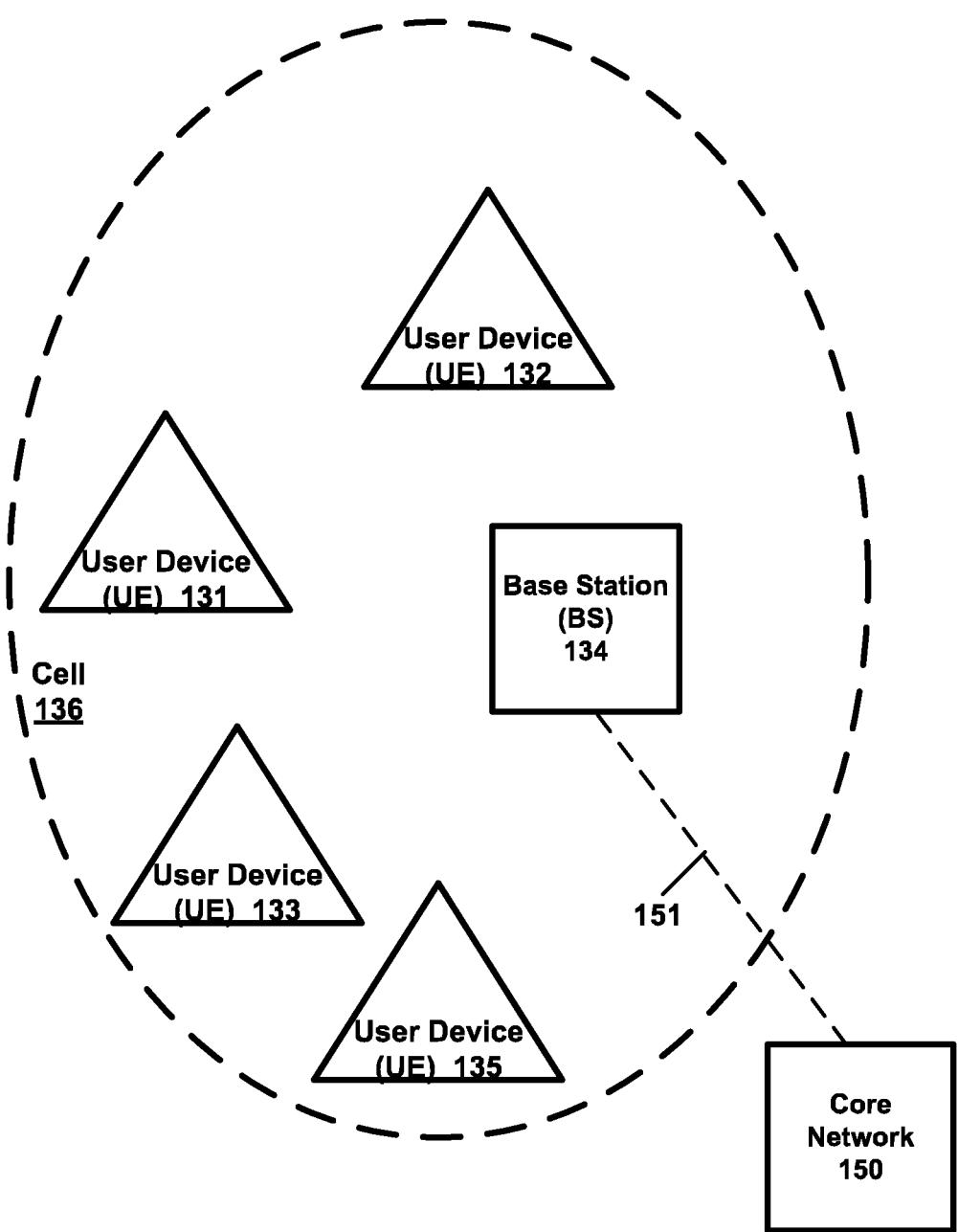
FIG. 1 is a block diagram of a wireless network according to an example embodiment.

FIG. 1 is a block diagram of a wireless network 130 according to an example embodiment. In the wireless network 130 of FIG. 1, user devices 131, 132, 133 and 135, which may also be referred to as mobile stations (MSs) or user equipment (UEs), may be connected (and in communication) with a base station (BS) 134, which may also be referred to as an access point (AP), an enhanced Node B (eNB), a gNB or a network node. The terms user device and user equipment (UE) may be used interchangeably. A BS may also include or may be referred to as a RAN (radio access network) node, and may include a portion of a BS or a portion of a RAN node, such as (e.g., such as a centralized unit (CU) and/or a distributed unit (DU) in the case of a split BS or split gNB). At least part of the functionalities of a BS (e.g., access point (AP), base station (BS) or (e)Node B (eNB), gNB, RAN node) may also be carried out by any node, server or host which may be operably coupled to a transceiver, such as a remote radio head. BS (or AP) 134 provides wireless coverage within a cell 136, including to user devices (or UEs) 131, 132, 133 and 135. Although only four user devices (or UEs) are shown as being connected or attached to BS 134, any number of user devices may be provided. BS 134 is also connected to a core network 150 via a S1 interface 151. This is merely one simple example of a wireless network, and others may be used.

A base station (e.g., such as BS 134) is an example of a radio access network (RAN) node within a wireless network. A BS (or a RAN node) may be or may include (or may alternatively be referred to as), e.g., an access point (AP), a gNB, an eNB, or portion thereof (such as a/centralized unit (CU) and/or a distributed unit (DU) in the case of a split BS or split gNB), or other network node.

According to an illustrative example, a BS node (e.g., BS, eNB, gNB, CU/DU, . . . ) or a radio access network (RAN) may be part of a mobile telecommunication system. A RAN (radio access network) may include one or more BSs or RAN nodes that implement a radio access technology, e.g., to allow one or more UEs to have access to a network or core network. Thus, for example, the RAN (RAN nodes, such as BSs or gNBs) may reside between one or more user devices or UEs and a core network. According to an example embodiment, each RAN node (e.g., BS, eNB, gNB, CU/DU, . . . ) or BS may provide one or more wireless communication services for one or more UEs or user devices, e.g., to allow the UEs to have wireless access to a network, via the RAN node. Each RAN node or BS may perform or provide wireless communication services, e.g., such as allowing UEs or user devices to establish a wireless connection to the RAN node, and sending data to and/or receiving data from one or more of the UEs. For example, after establishing a connection to a UE, a RAN node or network node (e.g., BS, eNB, gNB, CU/DU, . . . ) may forward data to the UE that is received from a network or the core network, and/or forward data received from the UE to the network or core network. RAN nodes or network nodes (e.g., BS, eNB, gNB, CU/DU, . . . ) may perform a wide variety of other wireless functions or services, e.g., such as broadcasting control information (e.g., such as system information or on-demand system information) to UEs, paging UEs when there is data to be delivered to the UE, assisting in handover of a UE between cells, scheduling of resources for uplink data transmission from the UE(s) and downlink data transmission to UE(s), sending control information to configure one or more UEs, and the like. These are a few examples of one or more functions that a RAN node or BS may perform.

A user device (user terminal, user equipment (UE), mobile terminal, handheld wireless device, etc.) may refer to a portable computing device that includes wireless mobile communication devices operating either with or without a subscriber identification module (SIM), including, but not limited to, the following types of devices: a mobile station (MS), a mobile phone, a cell phone, a smartphone, a personal digital assistant (PDA), a handset, a device using a wireless modem (alarm or measurement device, etc.), a laptop and/or touch screen computer, a tablet, a phablet, a game console, a notebook, a vehicle, a sensor, and a multimedia device, as examples, or any other wireless device. It should be appreciated that a user device may also be (or may include) a nearly exclusive uplink only device, of which an example is a camera or video camera loading images or video clips to a network.

In LTE (as an illustrative example), core network 150 may be referred to as Evolved Packet Core (EPC), which may include a mobility management entity (MME) which may handle or assist with mobility/handover of user devices between BSs, one or more gateways that may forward data and control signals between the BSs and packet data networks or the Internet, and other control functions or blocks. Other types of wireless networks, such as 5G (which may be referred to as New Radio (NR)) may also include a core network.

In addition, the techniques described herein may be applied to various types of user devices or data service types, or may apply to user devices that may have multiple applications running thereon that may be of different data service types. New Radio (5G) development may support a number of different applications or a number of different data service types, such as for example: machine type communications (MTC), enhanced machine type communication (eMTC), Internet of Things (IoT), and/or narrowband IoT user devices, enhanced mobile broadband (eMBB), and ultra-reliable and low-latency communications (URLLC). Many of these new 5G (NR)—related applications may require generally higher performance than previous wireless networks.

IoT may refer to an ever-growing group of objects that may have Internet or network connectivity, so that these objects may send information to and receive information from other network devices. For example, many sensor type applications or devices may monitor a physical condition or a status, and may send a report to a server or other network device, e.g., when an event occurs. Machine Type Communications (MTC, or Machine to Machine communications) may, for example, be characterized by fully automatic data generation, exchange, processing and actuation among intelligent machines, with or without intervention of humans. Enhanced mobile broadband (eMBB) may support much higher data rates than currently available in LTE.

Ultra-reliable and low-latency communications (URLLC) is a new data service type, or new usage scenario, which may be supported for New Radio (5G) systems. This enables emerging new applications and services, such as industrial automations, autonomous driving, vehicular safety, e-health services, and so on. 3GPP targets in providing connectivity with reliability corresponding to block error rate (BLER) of $10^{-5}$ and up to 1 ms U-Plane (user/data plane) latency, by way of illustrative example. Thus, for example, URLLC user devices/UEs may require a significantly lower block error rate than other types of user devices/UEs as well as low latency (with or without requirement for simultaneous high reliability). Thus, for example, a URLLC UE (or URLLC application on a UE) may require much shorter latency, as compared to a eMBB UE (or an eMBB application running on a UE).

The techniques described herein may be applied to a wide variety of wireless technologies or wireless networks, such as LTE, LTE-A, 5G (New Radio (NR)), cmWave, and/or mmWave band networks, IoT, MTC, eMTC, eMBB, URLLC, etc., or any other wireless network or wireless technology. These example networks, technologies or data service types are provided only as illustrative examples.

In a connected mode (e.g., RRC-Connected) with respect to a cell (or gNB or DU), a UE may be connected to a network node (e.g., BS, gNB, DU or other network node) and the UE may receive data, and may send data (based on receiving an uplink grant). Also, in a connected mode, UE mobility may be controlled by the gNB or network.

In order to conserve power, a UE may, for example, transition from a connected state (e.g., RRC_Connected) to an unconnected state, such as an Idle state (e.g., RRC_Idle) or Inactive state (e.g., RRC_Inactive), e.g., in which the UE may sleep (a low power state) much of the time while in Idle or Inactive state. In Idle state or Inactive state, the UE does not have a connection established with any cell, and mobility (e.g., determining which cell the UE will be camped on or which cell to select as the serving cell for the UE) is controlled by the UE. While in Idle state or Inactive state, the UE may sleep much of the time, and then periodically wake (e.g., changing from a low power state to a full-power state) to perform one or more tasks or processes, e.g., such as receiving system information from the cell the UE may be camped on (the serving cell for the UE while in Idle state or Inactive state), detecting a paging message (a paging message detected by the UE may indicate that the network has data for downlink transmission to the UE), and/or performing a cell search and cell reselection process in which the UE may measure reference signals from various cells, and then select a cell (or reselect the same cell) to camp on (as the serving cell), based on the received signals from various cells, or other tasks. Thus, as an example, cell selection may include selecting a cell that has a strongest reference signal received power (RSRP) and/or reference signal received quality (RSRQ), or other signal parameter. Thus, in Idle state or Inactive state, the serving cell may be referred to as the cell the UE has camped on. For example, a UE may typically receive system information (e.g., via receiving one or more broadcast system information blocks (SIBs)) from the serving cell (or the cell the UE is camping on) while the UE is awake in Idle state or Inactive state. The UE may receive system information via Other System Information (SI) which consists of all SIBs (system information blocks) not broadcast in the Minimum SI. The UE does not need to receive these SIBs before accessing the cell. Other SI can be called On-Demand SI because a gNB transmits/broadcasts these SIBs when requested by UE(s).

As noted, when a UE is in Idle state, there is typically no RRC context (the parameters necessary for communication between the UE and network) for the UE stored by the radio access network (network node, such as gNB, DU, BS) or UE. No uplink synchronization is maintained by the UE, and no data transfer may take place, as the UE sleeps most of the time to conserve battery consumption. The UE may wake periodically to measure reference signals, receive paging messages, perform cell reselection based on reference signal measurements, receive system information, and/or perform other tasks.

A UE in Idle state or Inactive state may use a random access (RA or RACH) procedure to transition to a Connected state. A random access (RACH) procedure may use a 4-step RACH procedure, or a 2-step RACH procedure (where some of the steps or messages in the 4-step RACH procedure may be combined). At step 1 (message 1 of the 4-step RACH procedure, for example), the UE transmits/ sends a random access (RACH) preamble to the network node or gNB or cell, which allows the network node or gNB to estimate transmission timing for the UE. At step 2 (message 2), the gNB transmits a random access response (RAR) message to the UE, which may include a timing advance command to allow the UE to perform uplink (UL) synchronization with the cell or gNB, and an allocation of a relatively small amount of resources for the UE to use for uplink (UL) transmission of the message 3 (at step 3) of the RACH procedure. At step 3 (message 3) of the RACH procedure, the UE may send a RACH control message, e.g., such as a Radio Resource Control (RRC) Resume Request (RRCResumeRequest) message, or a Radio Resource Control (RRC) Connection Request (RRCConnectionRequest) message, via the relatively small amount of resources provided via message 2. At step 4 (message 4 of the RACH procedure), the UE may receive from the gNB a contention resolution message to resolve any potential collisions. After receiving this message 4, the UE is connected with the cell or gNB, and the UE may then request and receive an UL grant (of resources) to allow the UE to transmit UL data to the cell or gNB.

In some cases, a UE positioning function may be used to determine a geographic position of a UE. In some cases, UE positioning may be performed or determined based on positioning reference signals (PRSs). For example, a positioning reference signal (PRS) may be a reference signal that may be transmitted to allow a UE position to be determined or estimated. In some cases, a UE position may be determined, for example, based on a measured timing and/or measured received power of one or more PRSs, for example. For example, PRSs may be or may include PRS sequences that may be pseudo-random sequences that have good (or relatively high) auto-correlation properties and small (or relatively low) cross-correlation properties, e.g., to allow timing or time differences of two signals to be determined. A description and/or qualities of an example PRS signal are described, as an example, within 3GPP TS 37.355 v16.1.0. Other PRS signals may be used as well.

Some example UE positioning functions may include Time Difference of Arrival (TDOA), such as downlink-TDOA (DL-TDOA), DL (downlink) Angle of Departure (DL-AoD), multi-round trip time (multi-RTT) positioning, or other techniques. For an example Time Difference of Arrival (TDOA) positioning technique, a UE may determine a reference signal time difference (e.g., between a received DL PRS, and a reference PRS stored by the UE), and may also possibly determine a reference signal received power of a received DL PRS. The UE may report these signal measurements to a network node (e.g., to a gNB, BS, or other network node). A positioning entity within the network (e.g., a positioning entity within a core network, in the cloud, on a gNB or BS, or other node or location) may determine a UE position based on the received signal parameters.

Applications or use cases may exist or may arise, such as asset location tracking, where a UE may be attached to (or incorporated within) an asset to allow the network to request or track the location of the asset. Or applications or use cases may exist or arise where the network may track a location of a UE(s). As part of a positioning procedure, a UE may measure and report measured signal parameter(s) of DL PRS signals, to allow a network to track the UE's (and thus the asset's) position. There may exist applications or uses where it may be useful to track a (e.g., geographic) position of an asset, such as tracking a position of a valuable object, tracking a package or container shipment, employee badge tracking, etc. In some cases, these UEs, which may be used for asset tracking, may be, e.g., low power, relatively inexpensive, disposable, etc. In some cases, these UEs that may be used for asset tracking may measure and report a signal parameter of a received PRS signal relatively infrequently, e.g., once a minute, once an hour, once a day, or other time period. The reporting time period may vary widely among different applications or use cases for asset tracking. Also, at any given time, there may be no UEs for asset tracking within a cell, and thus, e.g., there may be no need for transmission of PRS signals at that time. Or, there may be only a few UEs for asset tracking, and which may receive signals only within one or few beam directions. Therefore, for asset tracking or UE location tracking, there may be few or no UEs for asset tracking within a cell, or the position (or signals that allow determination of position) of such assets may only need to be reported relatively infrequently to the network. Therefore, in at least some cases, it may be relatively inefficient for a gNB (or other network node) to frequently or periodically transmit PRS signals, since there may be no need for these PRS signals at that time.

Therefore, in order to improve efficiency and reduce PRS transmission overhead, a PRS request procedure is provided in which a UE may use one or more steps of a random access procedure to request transmission, by a gNB (or other network node), of a PRS signal. The UE may request transmission of an asset tracking reference signal (ATRS), which may be a positioning reference signal (PRS) that may be transmitted to allow UE or asset position determination, e.g., for asset tracking purposes. In general, the positioning reference signal described in various embodiments may refer to any downlink reference signal measured for positioning measurement purposes (e.g., SSB, CSI-RS, PRS, ATRS).

FIG. 2 is a flow chart illustrating operation of a user device (or UE). Operation 210 includes determining, by a user device (e.g., a UE), an identifier to be used in a random access procedure to indicate a request for a positioning reference signal. Operation 220 includes selecting, by the user device, a downlink reference signal among a plurality of downlink reference signals received from a network node (e.g., gNB, DU or other network node). Operation 230 includes controlling sending, by the user device to the network node, as part of a random access procedure, a random access preamble via a random access resource associated with the selected downlink reference signal, and the determined identifier. Operation 240 includes controlling receiving, by the user device from the network node, the requested positioning reference signal. And, operation 250 includes carrying out a positioning procedure using the requested positioning reference signal.

FIG. 3 is a flow chart illustrating operation of a network node (e.g., BS, gNB, DU, or other network node). Operation 310 includes controlling receiving (or receiving), by a network node (e.g., gNB, DU or other network node) from a user device (e.g., UE) as part of a random access procedure, a random access preamble via a random access resource associated with a downlink reference signal. Operation 320 includes controlling receiving (or receiving), by the network node from the user device as part of the random access procedure, an identifier that indicates a request for transmission of a positioning reference signal that is associated with the downlink reference signal. And, operation 330 includes controlling sending (or sending), by the network node, the requested positioning reference signal.

The methods of FIGS. 2 and 3 illustrate an operation of a UE and a network node (e.g., gNB) that may provide or perform at least a portion of a PRS request procedure. The text hereinbelow and FIGS. 4-8 describe further possible details, features and/or operations for the methods of FIGS. 2-3.

Figure 4:
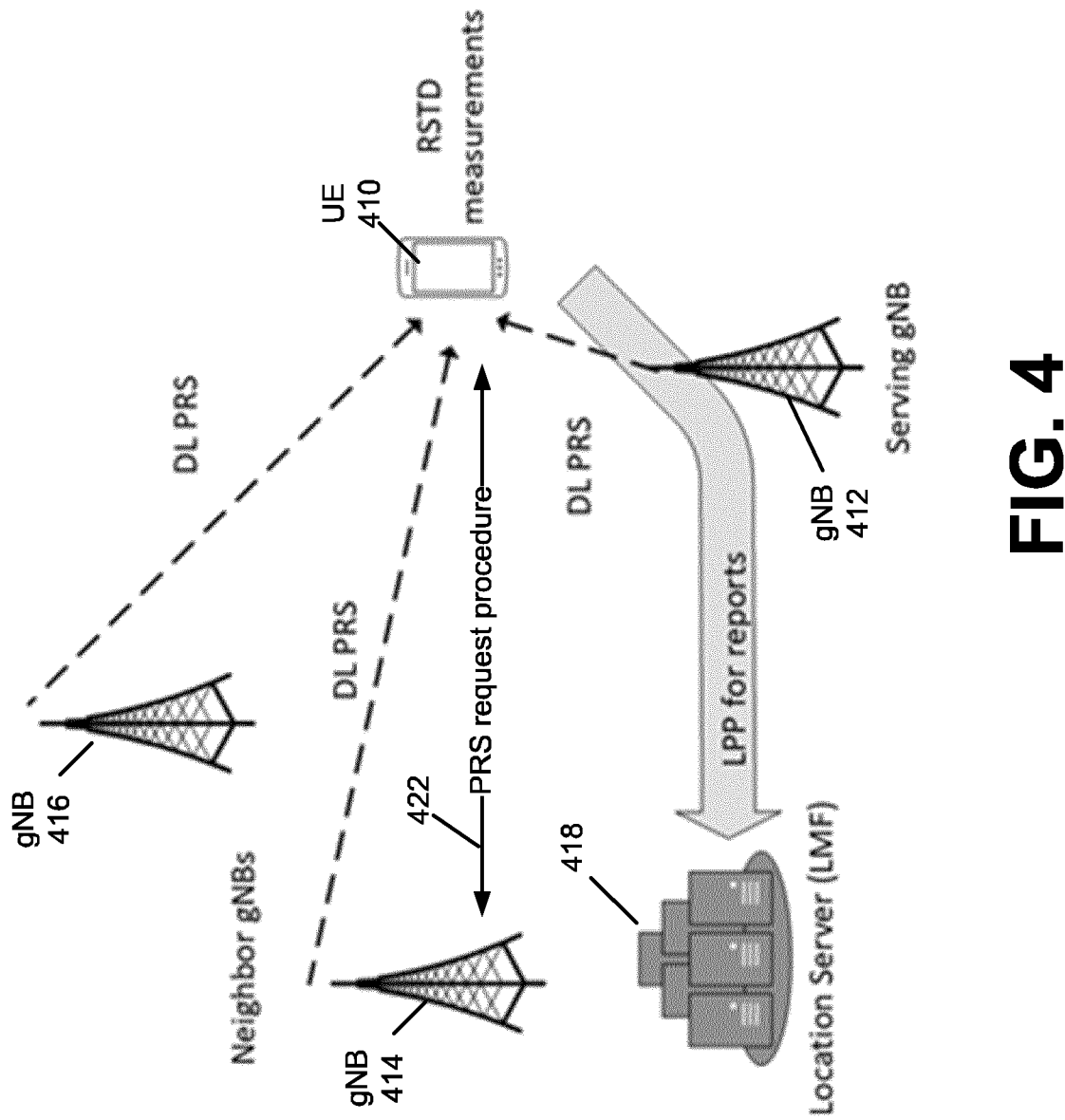
FIG. 4 is a diagram illustrating an example downlink (DL) Time Difference of Arrival (TDOA) positioning technique, which may be used with the methods of FIGS. 2-3.

FIG. 4 is a diagram illustrating an example downlink (DL) Time Difference of Arrival (TDOA) positioning technique, e.g., that may be used with respect to or in conjunction with the methods of FIGS. 2-3. A UE 410 may be in communication with, or may receive signals from, one or more gNBs (or other network nodes), including gNBs 412, 414 and 416. In general, the gNBs 412, 414 and 416 may transmit PRS signals, which may be received by UE 410. UE 410 may measure the reference signal time difference (RSTD) for each cell (or for each gNB). The UE 410 may report the RSTD measurements to a positioning entity, such as a location management function (LMF) 418, via a serving gNB 412. The LMF 418 may estimate the position of UE 410 based on the received RSTD measurements. As noted, a PRS request procedure 422 is provided, as described in the flow charts of FIGS. 2-3, that may allow a UE to request PRS signal transmission. UE 410 may perform the PRS request procedure with each gNB (e.g., gNBs 412, 414 and/or 416) that it would like to request and receive PRS signals from.

With respect to the methods of FIGS. 2-3, a gNB (or other network node) may use beamforming to transmit downlink reference signals via different beams. Downlink reference signals may include, for example, synchronization signal block (SSB) signals, channel state information-reference signal (CSI-RS) signals, or other reference signals. For example, a SSB may include primary synchronization signal (PSS), secondary synchronization signal (SSS) and a physical broadcast channel (PBCH). For example, for DL reference signal transmission, a gNB may perform beam sweeping to transmit DL reference signals (e.g., SSB or CSI-RS, or other reference signals) using time division multiplexing, so that each DL reference signal (e.g., SSB or CSI-RS) may be transmitted via different time resources. A SSB signal may be transmitted by a gNB via each of a plurality of different SSB beams. And, a CSI-RS signal may be transmitted by a gNB via each of a plurality of different CSI-RS beams. The UE may measure the reference signal received power (RSRP) (or other signal parameter) for one or more, or even all, of the reference signal beams, and then may select one or a few (e.g., a best or strongest) DL reference signal (or best beam, such as the DL reference signal or beam having a highest measured RSRP). In one example, UE may select at least one or one or more DL RS that has/have signal quality (such as RSRP) above a predetermined threshold. This threshold may have relation on the estimated reception level of the positioning reference signal. Threshold may also be a detection threshold, or it may be configured by network (e.g. via system information, via on-demand system information or using dedicated signaling). In some cases, if the signal quality threshold level is not exceeded by any of the DL RS, UE may select any (out of one or more of the) DL RS.

Figure 5:
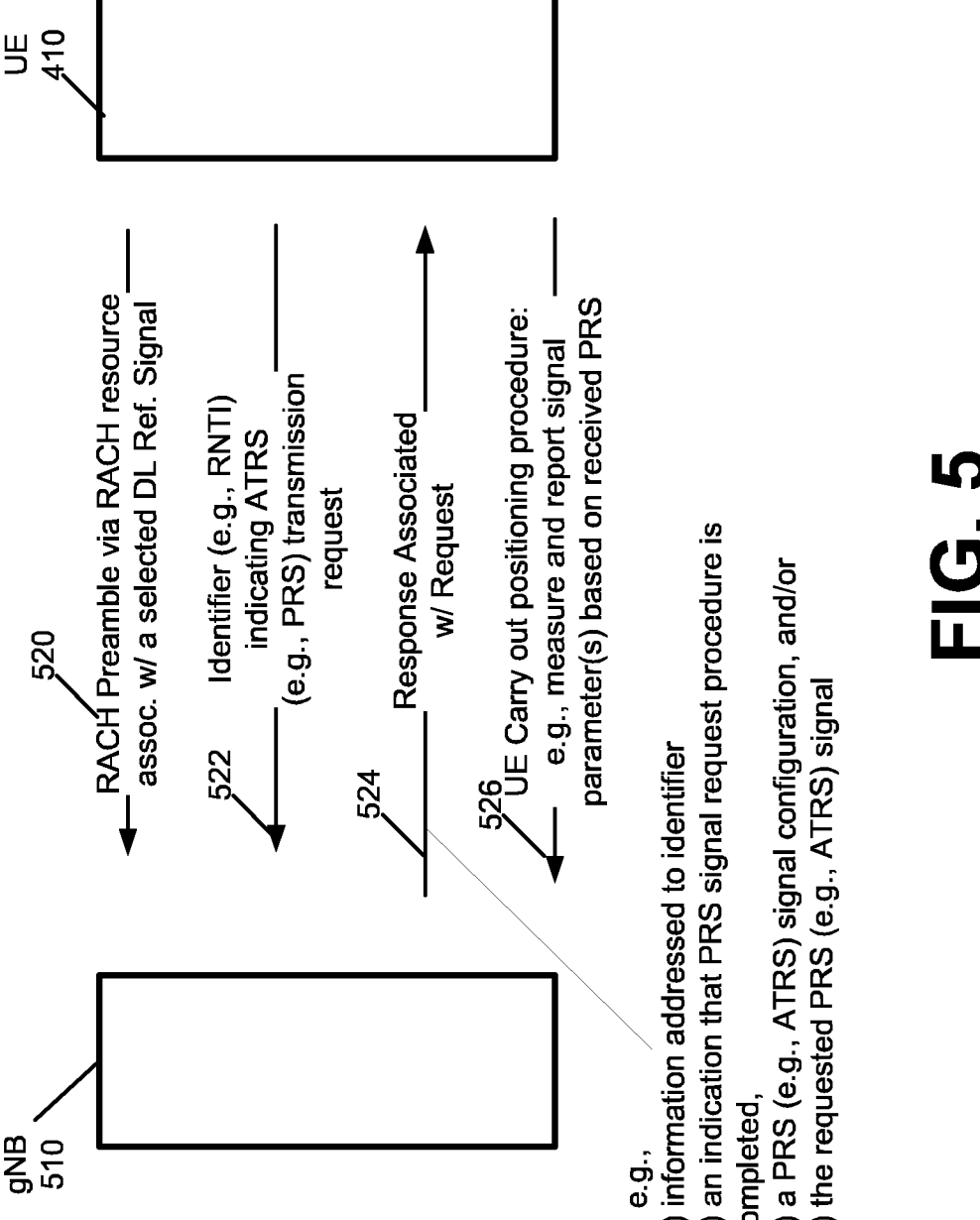
FIG. 5 is a diagram illustrating some features that may be provided for the PRS request procedure described in FIGS. 2-3.

FIG. 5 is a diagram illustrating some features that may be provided for the PRS request procedure described in FIGS. 2-3. Thus, a UE performing the method of FIG. 2, and/or a network node (e.g., gNB) performing the method of FIG. 3 may perform the UE and gNB operations, respectively, described with reference to FIG. 5, which provides further possible details of the methods of FIGS. 2 and 3. A random access procedure may typically be used by a UE to establish a connection to a cell or gNB (to allow the UE to transition to RRC_Connected state with respect to a gNB or cell). However, with respect to FIGS. 2-5, a UE 410 may request a PRS signal transmission via use of one or more messages of a random access procedure. UE 410 may select a downlink reference signal, e.g., based on a reference signal received power (RSRP) or other signal parameter of a reference signal(s) received from gNB 510. The UE 410 may, at least in some cases, determine that it is unable to receive a PRS signal from gNB 510 via a beam or a receive configuration associated with the selected downlink reference signal (e.g., via the same beam or other receive parameter that was used to receive the selected DL reference signal). For example, the UE 410 may be unable to receive a PRS signal within a cell, or be unable to receive a PRS signal using a particular UE DL receive beam, or be unable to receive a PRS signal with a desired PRS configuration (e.g., PRS signal having a short enough period). Also, for example, a UE may not have (e.g., may not have received) a configuration of a PRS signal, and thus, may not be able to receive the PRS signal. Or, the UE may be unable to detect a PRS signal.

At 520 (FIG. 5), the UE 410 (e.g., which may be in Idle state or Inactive state) may transmit (e.g., via message 1 of the random access procedure) a random access preamble via a random access resource associated with the selected down-link reference signal that can be received by the UE 410. This preamble transmission thus communicates or identifies the selected DL reference signal to the gNB 510.

At 522 (FIG. 5), the UE 410 may transmit (e.g., as message 3 of a random access procedure) an identifier (e.g., a radio network temporary identifier (RNTI)) that indicates a request for transmission of a PRS (e.g., ATRS) signal. Thus, the combination of the transmission (at 520) of the random access preamble via a random access resource associated with the selected DL reference signal (e.g., thereby indicating a specific gNB UL transmit beam), and the transmission (at 522) of the identifier that indicates a PRS signal transmission request, may provide a request to the gNB 510 for transmission of a PRS (e.g., ATRS) signal transmission via the same beam (e.g., via same gNB UL transmit beam) or configuration used by gNB 410 to trans-mit the selected (and indicated) DL reference signal.

In some examples, the identifier may refer alternatively or additionally to an identifier of a control message or an uplink control message. The identifier may identify the type or identity of a control message. As an example, the control message may be identified by using a LCID (logical channel identifier) value. The LCID value may identify a media access control (MAC) control element (MAC CE). In an example, to indicate the request for transmission of a PRS, a specific LCID value may be configured or reserved (to allow a UE to indicate a request for a PRS via transmission of such configured or reserved LCID). The control message may be provided in conjunction with an identifier (such as any type of RNTI described herein the document) during a random access (RA or RACH) procedure. In one example, the UE may provide a RNTI that indicates the request for transmission of PRS. In some examples, the control message (e.g., a MAC CE with specific LCID value or other identifier identifying the purpose of the MAC CE as a request for PRS transmission) may be used as an identifier/request for trans-mission of PRS. The MAC CE may be transmitted without specific radio network identifier such as RNTI that would identify that the RACH procedure is used for requesting PRS transmission. In yet another example, the identifier may refer to a specific radio resource control (RRC) information element, or a field in an RRC information element carried by the RRC message. In one example, the identifier may represent a group of UEs.

At 524 (FIG. 5), the gNB 510 may send to the UE 410 a response associated with the request, e.g., where the response may include one or more of (for example): 1) a response or information addressed to the identifier (e.g., where a cyclic redundancy check (CRC) of such response may be scrambled based on the identifier); 2) information indicating that a positioning reference signal (PRS) (e.g., ATRS) request procedure is completed (e.g., and thus, the UE should expect the PRS (e.g., ATRS) signal transmission as requested); 3) information indicating a configuration of the requested PRS signal (e.g., which may indicate a time period that the PRS signal will be transmitted); and/or 4) the requested PRS (e.g., ATRS) signal. The response at 524 may be or may include different information or additional infor-mation. In an example, in case UE 410 uses C-RNTI/TC-RNTI during RACH procedure and provides (or includes within a transmission) a MAC CE to request PRS transmis-sion, the network response may be addressed to the provided radio network identifier (RNTI). In some examples the network response may be a MAC CE or another message.

Also at 524, the UE 410 may monitor (attempt to receive) the requested PRS signal via a same receive configuration (e.g., a same DL receive beam, and/or time resources, and/or other receive configuration parameters) that may have been used by the UE to receive the selected DL reference signal. Thus, at 524, the UE may receive a PRS configuration and the requested PRS.

Also, at 526 of FIG. 5, after receiving the requested PRS signal(s), the UE 410 may carry out a positioning procedure (for the UE) using (or based on) the requested positioning reference signal(s) (PRS). The requested PRS signal(s) may refer to one or more configured and or transmitted signals on one or more beams of a cell or one or more cells or set of cells. At 526 (or in general after providing a PRS request or successfully requesting PRS), UE 410 may carry out the positioning procedure using one or more PRS signals trans-mitted by the network. In some examples, UE may request PRS on a specific beam or beams and carry out positioning procedure using one or more PRS signals transmitted by network (from one or more cells or gNBs). The positioning procedure may be carried out using one or more PRS signals that may be associated with the beam indicated during the PRS request (e.g. in a RACH procedure or after the RACH procedure). The UE carrying out a positioning procedure may include the UE measuring and reporting (via a network node such as via gNB 510) a signal parameter (e.g., RSRP and/or RSTD) to a positioning entity (e.g., such as to LMF 418, FIG. 4), to allow the UE position to be determined by the positioning entity. Thus, for example, the UE carrying out a positioning procedure may include, e.g., measuring, by the UE as part of the positioning procedure, a reference signal time difference (RSTD) based at least on the received positioning reference signal; and sending, by the UE (e.g., to a positioning entity via a network node such as gNB 510), a message including the measured reference signal time difference (RSTD) or other measured signal parameter(s), which may be used by the positioning entity to determine a position of the UE 410. Alternatively, the UE carrying out the positioning procedure may include the UE determining or estimating its (the UE's) position, at least partially, based on the received PRS signal(s) from one or more cells or network nodes (gNBs), and reporting such UE position (or partial UE position) to the network e.g., to a network node or gNB, or core network, or a positioning entity.

Figure 6:
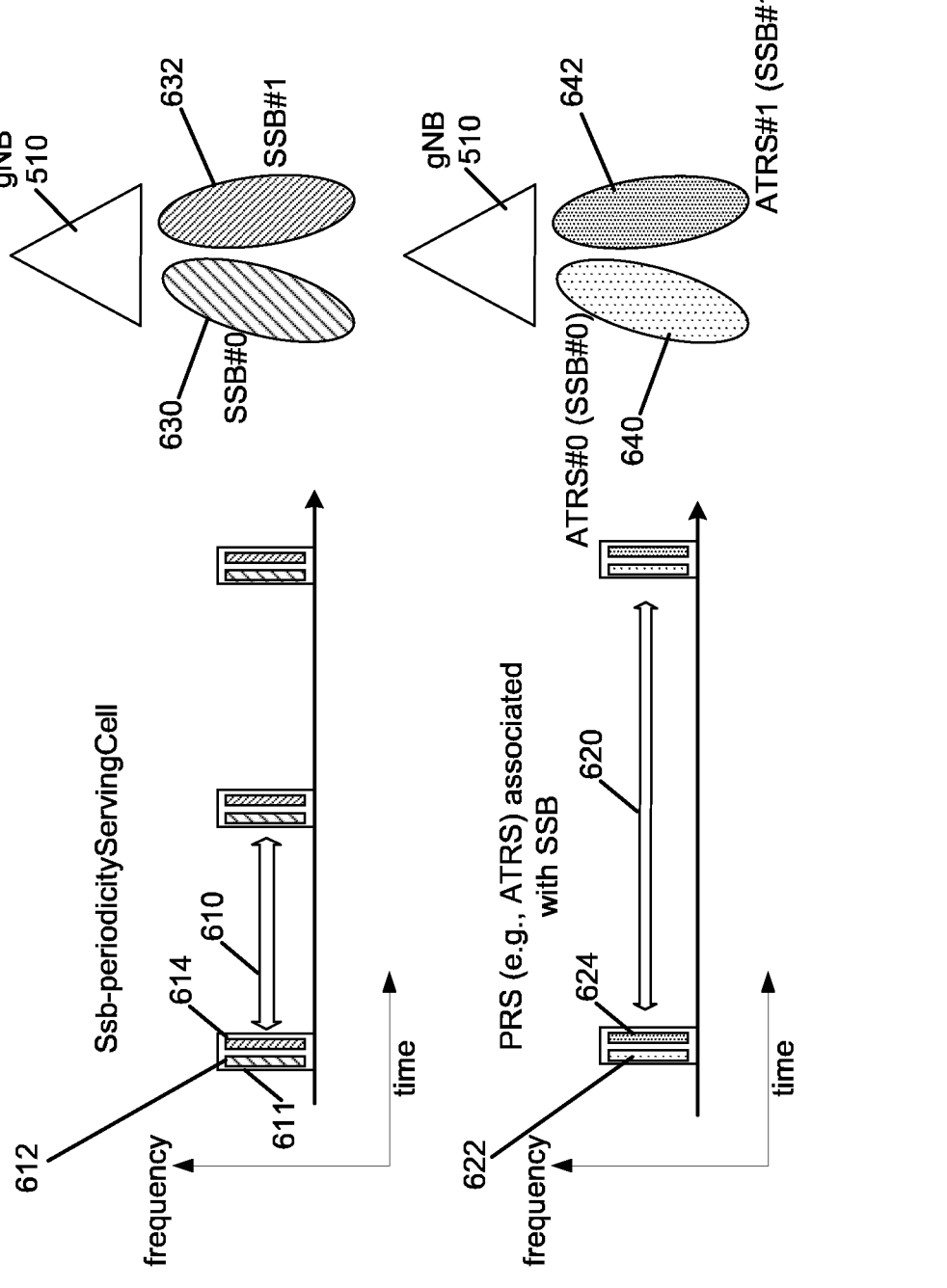
FIG. 6 is a diagram illustrating an association or a quasi-colocation relationship that may exist between a downlink reference signal and a positioning reference signal, for the methods of FIGS. 2-3.

FIG. 6 is a diagram illustrating an association or a quasi-colocation relationship that may exist between a downlink reference signal and a positioning reference sig-nal, for the methods of FIGS. 2-3. As noted, a gNB 510 may use beam sweeping to transmit a DL reference signal, such as a SSB signal, via each of a plurality of different beams, e.g., with each beam pointing in a different direction. For example, gNB 510 may transmit SSB #0 via downlink (DL) transmit beam 630, and may transmit SSB #1 via DL transmit beam 632. Within one beam sweep, for example, a total of 64 (or other number of) SSB signals may be transmitted via 64 different SSB beams. A SSB signal period or periodicity 610 is shown, where the gNB 510 may transmit a SSB burst (or SSB group of SSB signals) 612, including SSB #0 at 612, and then transmit SSB #1 at 614, etc. Other SSB signals may also be transmitted. Also, a PRS periodicity 620 is shown (which may have a different periodicity than the SSB periodicity 610), including a group of possible transmitted PRS signals that may include a transmission of ATRS #0 at 622 and/or ATRS #1 at 624. As described herein, a gNB (or other network node) may transmit a PRS (e.g., ATRS) on request.

With reference to FIG. 6, for gNB 510, a PRS signal (e.g., which may be transmitted on request by the UE) may be associated with a DL reference signal. In this example, each PRS signal may be associated with a (e.g., different) SSB signal. A PRS signal may be associated with a SSB signal (or a DL reference signal) when the PRS signal is transmitted by gNB 510 using the same beam as the SSB signal. As shown in FIG. 6, gNB 510 may transmit a SSB via a same DL transmit beam (or same beam direction) as the associated PRS signal, e.g., based on a quasi-colocation relationship that may exist between the SSB signal and the associated PRS signal. Therefore, for example, a PRS signal may be associated with a DL reference signal (e.g., with a SSB signal) based on a quasi-colocation relationship between the SSB signal and the associated PRS signal. As shown in FIG. 6, ATRS #0 is associated with SSB #0, and thus ATRS #0 is transmitted via beam 640, which is the same DL transmit beam (or same beam direction) as DL transmit beam 630 used to transmit SSB #0. Likewise, ATRS #1 is associated with SSB #1, and thus ATRS #1 is transmitted via beam 642, which is the same DL transmit beam (or same beam direction) as DL transmit beam 632 used to transmit SSB #0. The quasi-colocation relationship between a DL reference signal and an associated PRS signal may indicate that a same DL transmit beam is used by the gNB to transmit both of these signals, and also may mean (or may indicate) that the UE may use a same receive configuration (e.g., including same DL receive beam) to receive both of these associated signals (the DL reference signal and the associated PRS signal). An association, such as a quasi-colocation relationship, may exist between a downlink reference signal and a PRS signal such that a UE may use a same or common receive configuration to receive both a selected DL reference signal (e.g., SSB signal or CSI-RS signal) and an associated PRS signal. A common receive configuration at the UE may include one or more of: a doppler shift, a doppler spread, average delay, delay spread, and/or a spatial receive parameter (e.g., DL receive beam).

With respect to the embodiments of FIGS. 2-3, UE may determine an association of PRS signals and DL reference signals (e.g., based on indicated quasi-colocation of such signals) via one or more techniques, including one or more of: 1) the UE may be pre-configured with an association between a DL reference signal and a PRS signal; 2) the UE may receive such information via received system information (e.g., via a received system information block (SIB) received by the UE from a gNB); or 3) by the UE receiving control information (e.g., downlink control information (DCI), a MAC (media access control) control element, a RRC (radio resource control) message or other message or control information) sent by the gNB to the UE that may indicate such association or quasi-colocation relationship between a DL reference signal and a PRS signal. Thus, based on this information (indicating an association of a PRS signal and a DL reference signal), if a UE can receive a DL reference signal from a gNB, or e.g., if a UE selects a DL reference signal as a best DL reference signal from a gNB (or a reference signal(s) that has signal quality above a threshold value, wherein the threshold may be a detection threshold, pre-determined value or configured by network), this may typically indicate that the UE can also receive the associated PRS signal from the gNB, if or when the gNB is transmitting such associated PRS signal, using a same receive configuration. As noted, the gNB may transmit such PRS signal in response to a request for such PRS signal transmission that may be sent by the UE to the gNB via the transmission of the random access preamble and identifier as part of the PRS request procedure of FIGS. 2-3.

Also, with respect to the methods of FIGS. 2-3, the UE may determine a configuration of an identifier, e.g., including the identifier that may be used to indicate (or that may indicate when transmitted to the gNB) a request for transmission of a PRS signal (e.g., a request for transmission of an ATRS signal). The identifier configuration may include, e.g., the identifier, for what cell it may be used for, an indication that the identifier may be used only for a particular beam(s) (e.g., particular DL reference signal(s)), or other configuration information. A UE may determine an identifier configuration (including the identifier) via one or more ways, including one or more of: 1) the UE may be pre-configured with an identifier(s) that may be used by the UE to indicate to the gNB a request for a transmission of a PRS signal; 2) the UE may receive an identifier(s) (which may be used by the UE to indicate to a gNB a request for a transmission of a PRS signal) via received system information (e.g., via a received system information block (SIB) received by the UE from a gNB); or 3) by the UE receiving control information (e.g., downlink control information, a MAC control element, a RRC message or other message) from the gNB that may indicate identifier(s) that may be used by the UE to indicate to the gNB a request for a transmission of a PRS signal. The identifier (which may be used by a UE to indicate a request for transmission of a PRS signal) may be, for example, a radio network temporary identifier (RNTI). For example, the identifier may be at least one of an asset tracking-radio network temporary identifier (AT-RNTI); an inactive-radio network temporary identifier (I-RNTI); a paging radio network temporary identifier (P-RNTI); or a cell-radio network temporary identifier (C-RNTI); or a Temporary cell-radio network temporary identifier (Temporary C-RNTI (or TC-RNTI)). An identifier may also be a preconfigured LCID value of a MAC CE or a preconfigured field/message ID value of an RRC message. In some examples, the network (e.g., gNB or other network node) may additionally or alternatively indicate via system information, via on-demand system information or dedicated signaling that it supports or has enabled the provision of PRS transmission or provision of PRS transmission via (or in response to) a UE request (e.g., in the current cell, set of cells, RAN notification area, tracking area, frequency layer). In some examples, receiving the PRS configuration from the network may additionally or alternatively refer to a case where the network indicates via system information or via on-demand system information that it supports or has enabled the provision of PRS transmission or provision of PRS transmission via (or in response to a) UE request. An AT-RNTI may be a radio network temporary identifier that may be particularly allocated or provided to allow a UE(s) (or one or more UEs, or even all UEs, within a cell, for example) to indicate to a gNB a request for transmission of a PRS signal. As noted, other types of RNTIs may also be used for this purpose, such as a C-RNTI, P-RNTI, I-RNTI, e.g., where, at least in some cases, a designated RNTI value or range of RNTI values of one or more of these RNTIs may be used by a UE, e.g., within a random access procedure, to indicate a request for transmission of a PRS signal.

Also, with respect to the method of FIGS. 2-3, the identifier (e.g., AT-RNTI or other identifier) may be cell specific. This identifier (e.g., AT-RNTI or identifier of an MAC CE or RRC message or field of a message) may be used by one or more, or even all UEs within a cell to request PRS (or ATRS) signal transmission within the cell (e.g., the request may be specific for an indicated beam or it may apply for the (e.g., all or multiple) beams of a cell), or the identifier may be assigned to or used only for a subset of beams (identified by one or more DL reference signals) within the cell (e.g., may be used to request PRS signal transmission only for a particular beam(s) or associated with a particular DL reference signal(s)), or for one or more frequency layers or carriers. The identifier (e.g., AT-RNTI or other identifier) may be shared or used by one or more UEs that are considered as asset tracking devices or devices that may be capable performing a portion of a positioning procedure, e.g., such as an asset tracking (or position update) procedure, or any device or a UE performing positioning measurements, such as for a positioning procedure. A UE may transmit this identifier (e.g., AT-RNTI, or other identifier) to a gNB, e.g., within message 3 (msg3) of a random access procedure, to request a transmission of a PRS (e.g., ATRS) signal. The network or gNB may then transmit a PRS (e.g., ATRS) signal on at least the beam indicated on message 1 (msg1) of the random access procedure. In one example, the UE may expect the network (e.g., gNB or other network node) to provide at least one PRS transmission occasion on at least the indicated beam during the random access procedure. In some examples, the request may be used to indicate to the network that the UE requires (and/or is requesting) a PRS transmission on one or more beams (or even all beams) of the cell where the indication was made. In some examples, the random access procedure used for requesting transmission of PRS may cause the UE to re-select to the cell to which the RA procedure was performed. In some examples, UE may perform the random access procedure for requesting PRS on the currently selected cell. Alternatively or additionally, a control message such as MAC CE or RRC message may be used to indicate the request for PRS transmission according to the methods described herein. As an example, the MAC CE may be transmitted as part of RACH procedure (e.g., in msg.3). The MAC CE may, e.g., include (or in some cases may include only) the LCID that identifies the type of MAC CE, wherein the type of MAC CE may indicate a request for PRS transmission. The request may be specific for a specific beam or beams (or a request for PRS associated with a specific DL RS(s), e.g., which may be indicated by the RA resource used to transmit the RA preamble). In some examples, the different LCID value may indicate different requests, e.g., the request may be specific for a beam (identified e.g., by DL RS), a set of beams, a cell, a set of cells, or a frequency layer (or carrier frequency). In one example, the UE may be configured with an identifier such as RNTI to be used in a random access (RA or RACH) procedure and the UE may request PRS transmission by providing both a configured RNTI and MAC CE for PRS request during the RACH procedure. In an alternative example, the UE may use Temporary C-RNTI or C-RNTI (that indicates the temporary identity that is used by the MAC entity during Random Access) and send the MAC CE for PRS request. The MAC CE may be sent, e.g., in MsgA/Msg3 of RACH procedure or after successful completion of RACH procedure. In some examples, the MAC CE used to request the PRS transmission on at least the indicated beam (or a cell or a set of cells) may carry additional information to indicate whether UE requests the PRS on only the beam indicated during the random access procedure or for specific subset of beams or all the beams of the cell.

In one example, in any of the embodiments herein, the request for PRS in case of 2-step RACH, in The MAC CE/RRC message and/or the RNTI for PRS request may be transmitted on MsgA (of a 2-step random access procedure) or after completion of RACH procedure.

In one example, the request for PRS transmission using an identifier during random access procedure may cause the network to transmit a PRS configuration in system information (e.g., in a SIB). In one example, if UE determines that it is unable to receive PRS on a specific beam or a cell, the UE may send the PRS request via RACH to trigger the network (e.g., gNB) to send/transmit a PRS configuration via system information or via on-demand system information.

FIG. 7 is a flow chart illustrating one or more operations of a user device (or UE) described in the method of FIG. 2 may perform. Thus, a UE performing the method of FIG. 2, may perform the UE operations described with reference to FIG. 7, which provides further possible details of the method of FIG. 2. Also, for some operations, the flow chart of FIG. 7 may also describe some further possible details or operations of the method of FIG. 3, that may be performed by a network node (e.g., gNB).

At 710 (and also with respect to operation 210 in FIG. 2), the UE 410 may receive a configuration of an identifier (e.g., AT-RNTI or other identifier), including an identifier (e.g., AT-RNTI), that may be used in a random access procedure to request transmission of a PRS (e.g., ATRS) signal, e.g., for asset tracking purposes. Therefore, at 710, UE 410 may receive the identifier that may be used, e.g., within a cell, or for one or more specific beams or DL reference signals within the cell, to request transmission of a PRS (e.g., ATRS) signal.

While in Idle state or Inactive state, a UE may sleep much of the time, and then periodically wake (e.g., changing from a low power state to a full-power state) to perform various tasks or functions. UE 410 may occasionally wake from a low power state (e.g., while in Idle or Inactive state), measure RSTD and/or RSRP of received PRS (e.g., ATRS) signals from one or more gNBs, and send these updated PRS (or ATRS) measurements to report its location to the positioning entity of the network.

For example, at 720, after waking from a sleep state, UE 410 may detect that it does not (or is unable to) detect a transmission of an PRS (or ATRS) within its cell, or on its currently selected DL receive beam within a cell. For example, and with respect to operation 220 of FIG. 2, after waking from sleep or low power state, the UE 410 may first measure RSRP of one or more DL reference signals (e.g., SSB signals, and/or CSI-RS signals), and may select one of these DL reference signals within the cell (e.g., the DL reference signal having a highest RSRP). At 720, the UE 410 may then monitor, e.g., attempt to receive a PRS (e.g., ATRS) signal via a receive configuration (e.g., UE DL receive beam) that was used to receive the selected DL reference signal. At 720, the UE may determine that the PRS (or ATRS) signal is not transmitted by the gNB or network within the cell (e.g., because the UE 410 is unable to receive such PRS signal within the cell), or that a PRS (e.g., ATRS) signal associated with the selected DL reference signal is not transmitted by the network (e.g., because the UE 410 is unable to receive a PRS or ATRS signal via the same receive configuration or UE DL receive beam that it used to receive the selected DL reference signal). Or, a PRS (e.g., ATRS) signal may be received by the UE, but the configuration of such received ATRS may be insufficient or inadequate, e.g., a periodicity of such PRS (or ATRS) signal may not meet the needs of the UE. Thus, at 720, for one or more reasons, the UE 410 may make a determination to request transmission of a PRS (e.g., ATRS) signal from a network node (e.g., gNB).

In further non-limiting examples, the UE 410 being unable to receive PRS (ATRS or any positioning specific reference signal or any DL RS signal that may be requested using an identifier during random access procedure) may refer to one or more of following cases: 1) UE 410 may not be able to detect the PRS transmission by network due to the low signal quality. 2) UE 410 may not be able receive PRS associated with specific beam or a cell if it determines that it has no configuration for the PRS signal. As an example, the configuration for the PRS transmission in a cell may be provided via system information, via on-demand system information or via dedicated signaling or other signaling means by network and UE 410 may determine that the PRS is not transmitted by network on one or more of selected beam(s). 3) UE 410 may not be able to receive the PRS associated with a specific beam or a cell due to the lack of PRS transmission by network. As an example, network may not transmit the PRS always to save transmission resources and energy but only when, e.g., requested by a UE or during specific time period(s) (e.g., within a day or within an hour). As an example, network may provide the configuration for PRS (e.g. provide the potential transmission occasions) in a system information but, in some cases, the network or gNB may only transmit these PRS signals when requested or during a specific time period(s). 4) UE 410 may be unable to receive a PRS signal with a desired PRS configuration (e.g., PRS signal having a short enough period or the PRS bandwidth is not wide enough or in general the current configuration of parameters is not suitable for supporting, e.g., the UE 410 positioning accuracy or latency requirements.

At 730, and also with respect to operation 230 of FIG. 2 and operation 520 of FIG. 5, the UE may select or determine a random access resource (e.g., time/frequency resource) associated with the selected DL reference signal. For example, one or more random access resources may be associated with each DL reference signal (and thus with each beam). At 730, the UE 410 may send (or control sending), e.g., via message 1 of a random access procedure, a random access preamble via the random access resource associated with the selected DL reference signal. Or, e.g., if there is one beam or one DL reference signal within a cell, UE 410 may send a random access preamble via a random access resource associated with the cell (or associated with the DL reference signal of the cell).

At 740, and also with respect to operation 240 of FIG. 2 and operation 522 of FIG. 5, the UE 410 may send (or control sending) to the network node or gNB, e.g., via message 3 of the random access procedure, the identifier (e.g., AT-RNTI) that may be used in a random access procedure to request transmission of a PRS (e.g., ATRS) signal, e.g., for asset tracking purposes.

At operations 750 and 760, and also operation 250 of FIG. 2 and operation 524 of FIG. 5, the UE 410 may receive a response associated with the request for transmission of a PRS (or ATRS) signal. For example, at 750, the UE 410 may receive a downlink control information (DCI) from the gNB that is addressed to the identifier, e.g., where a cyclic redundancy check (CRC) of the message including the DCI is scrambled based on the identifier (e.g., based on the AT-RNTI) that was sent to the gNB as part of the request for transmission of PRS or ATRS signals. This DCI or message may be or may provide an indication that the PRS or ATRS signal request procedure is completed (e.g., and thus the gNB will transmit the PRS (or ATRS) signal as requested). At 760, the UE 410 may monitor PRS (e.g., ATRS) signal transmissions within the cell, and/or PRS (or ATRS) signal transmissions associated with the selected DL reference signal. Thus, for example, the UE 410 may use a same receive configuration (e.g., a same UE DL receive beam) to monitor (e.g., attempt to receive) PRS signals that the UE used to receive the selected DL reference signal. If the UE is unable to receive the (e.g., requested) PRS (e.g., ATRS) signal, the PRS signal request procedure may be repeated. In one example, the network response may indicate whether the PRS is or will be transmitted on the selected beam or set of beams or in a cell. In another example the network response may cause it update/provide the PRS configuration in system information. In one example the network response may cause UE to receive or monitor system information for PRS configuration update.

In some further possible details regarding the use of an identifier during a random access procedure (e.g., in RACH procedure msg3) to request transmission of a downlink reference signal that may be associated to the indicated/selected downlink reference signal by the Msg1 or Msg.A the requested signal may be any downlink reference signal (e.g. CSI-RS, CSI-RS for tracking (TRS),) which transmission may be associated with the selected DL RS of the random access procedure.

Some further possible details, features and/or operations are now described that may be used in the methods of FIGS. 2-3.

A UE may be provided with the AT-RNTI for PRS (or ATRS) signal request in addition to a C-RNTI that may typically be used to establish a connection with the cell or gNB. Thus, by providing a AT-RNTI for PRS (e.g., ATRS) signal request, and a separate C-RNTI, in the random access procedure where the UE sends the AT-RNTI, the UE informs the network or gNB that this random access procedure is only for requesting transmission of a PRS (e.g., ATRS) signal, and is not to establish a connection (RRC connection) with the cell or gNB. Also, when the UE sends the C-RNTI in a random access procedure in this example, this indicates to the gNB that the UE is establishing a connection and not requesting transmission of a PRS signal. Thus, different RNTIs may be used for different purposes. After the UE sends this AT-RNTI to the gNB, the gNB or network does not expect the UE to remain in a connected state.

A UE may be provided with the AT-RNTI in addition to I-RNTI. Using that AT-RNTI, the UE and network know that the procedure is only for requesting PRS or ATRS for UE in RRC_INACTIVE (or RRC_IDLE) state and the UE is not trying to resume RRC connection or RRC state transition to RRC_CONNECTED. If UE uses I-RNTI, network determines that this random access procedure is requesting RRC resume, not for requesting PRS or ATRS transmission.

As part of a PRS (or ATRS) signal request, the UE may send or provide an additional identifier using RRC message once the random access procedure using AT-RNTI is completed. The RRC message may be provided in the UL (uplink) grant scheduled by network in msg-4 of the random access (RA) procedure. The gNB or network identifies the specific request based on the AT-RNTI and is able to receive the RRC level message and decode any information provided in the message, e.g., request to trigger or cause the PRS (or ATRS) transmission without requiring potentially to provide any further RRC level configuration. In this case, a further message may be sent by the UE to provide additional information to the gNB, after the random access procedure using AT-RNTI is completed.

Also, when a UE has unsuccessfully completed the random access procedure using AT-RNTI, the UE may monitor the PRS or ATRS signal associated with the DL reference signal selected during the random access procedure at least one or N-cycles of PRS (or ATRS) transmission or M-milliseconds/seconds: If UE is not able to detect ATRS it may reinitiate RA procedure for ATRS request.

The identifier the UE provides in the random acces procedure may be configured by network via broadcast system information (e.g., SIB) or it may be preconfigured, or may be obtained by the UE or device that is being tracked, through a configuration procedure, in one example: UE may be configured to enter connected mode to obtain the identifier (it may be configured using RRC signaling), or an identifier may be given to UE during a random access procedure, or an identifier is broadcasted in the system information, or UE may receive the identifier as part of higher layer configuration wherein the configuring entity may be a positioning entity, such as a LMF (location management function) 418 (FIG. 4) on server side for position signaling).

An identifier (e.g., AT-RNTI) configuration may be provided to the UE, which may indicate, e.g., the identifier and a validity time or other configuration parameter. The validity time for transmission of the PRS (or ATRS) signal may be sent to the UE, or may preconfigured, or may be broadcast by gNB, e.g., via SIB. Or a default PRS validity time may be used. If validity (validity time period) of the PRS (or ATRS) has expired, the UE may request a new ATRS using the existing AT-RNTI, by sending another request for PRS (or ATRS) signal transmission.

Also, the UE may not receive the requested/allocated PRS (or ATRS) signal correctly, due to blocked beam, orientation of device, degradation of radio conditions, etc. The UE may re-initiate the random access procedure instead of establishing beam recovery procedure. The existing AT-RNTI may be used or the network can allocate a new AT-RNTI using the above procedure(s).

The ATRS may be a PRS (Positioning Reference Signal) or any reference signal that may be used to allow determining of a UE position, track a position of an asset, and/or that may be designed for low/reduced complexity device, NR-Lite, NB-IoT, etc.

The network may not need to reserve random access resources in the air interface to allow request for ATRS to be transmitted, e.g., on a specific beam of a cell. The request procedure may be under control of network. Thus, in some cases, the UE is not able to request PRS transmission unless network has been configured for the request, and the network provides or indicates the identifier to the UE to be used to request such PRS (or ATRS) signal transmission.

For the ATRS request, UE does not need to enter CONNECTED state and upon successful completion of random access procedure, the UE can continue in IDLE/INACTIVE state for low overhead position tracking.

The network or gNB can determine per beam or a in beam/cell specific manner, based on UE requests, where and when to send any PRS (or ATRS) signal (e.g., for a specific beam, and in response to receiving the PRS transmission request, which provides a relevant time of when the UE needs the PRS signal transmission). The gNB or network may also indicate a validity or periodicity of the PRS or ATRS signals. In one further example, the network response may comprise further information whether the request is accepted or not.

Example 1. A Method Comprising

Determining (e.g., operation 210, FIG. 2), by a user device (e.g., UE 410, FIGS. 4-5) an identifier (e.g., a radio network temporary identifier (RNTI), such as an asset tracking-radio network temporary identifier (AT-RNTI), an inactive-radio network temporary identifier (I-RNTI), a paging radio network temporary identifier (P-RNTI), a cell-radio network temporary identifier (C-RNTI) or an identifier of a control message, a logical channel identifier or other identifier), to be used in a random access procedure to indicate a request for a positioning reference signal (PRS); see also, e.g., operation 710, FIG. 7, as an example of determining an identifier.

Selecting (e.g., operation 220, FIG. 2), by the user device (UE 410), a downlink reference signal (e.g., SSB, CSI-RS or other downlink reference signal, such as SSB #0 630, FIG. 6) among a plurality of downlink reference signals (e.g., SSB #0, SSB #1, . . . , FIG. 6) received from a network node (e.g., gNB 510, FIGS. 4-6);

Controlling sending (or sending, e.g., operation 230, FIG. 2) by the user device (e.g., UE 410, FIGS. 4-5) to the network node (e.g., gNB 510, FIGS. 4-6), as part of a random access procedure (e.g., within msg. 1 a RACH procedure), a random access preamble (e.g., RACH preamble transmission, operation 510, FIG. 5; operation 730, FIG. 7) via a random access resource associated with the selected downlink reference signal (e.g., associated with a selected SSB #0, FIG. 6), and the determined identifier (e.g., UE 410 transmits, within RACH msg3, a determined RNTI to be used to request a PRS transmission; and/or operation 522 of FIG. 5 where UE 410 transmits identifier (e.g., RNTI) to gNB 510; see also operation 740, FIG. 7); see also operations 730, 740 FIG. 7 as another example, of UE sending a random access preamble (operation 730) and an identifier (operation 740).

Controlling receiving (or receiving, e.g., operation 240, FIG. 2) by the user device (e.g., UE 410) from the network node (e.g., gNB 510), the requested positioning reference signal (e.g., operation 524, where UE 410 may receive requested PRS, such as ATRS #0, via beam 640 that is received via same beam as selected SSB #0, beam 630, FIG. 6); and Carrying out (e.g., operation 250, FIG. 2) a positioning procedure using the requested positioning reference signal (e.g., operation 526, where UE measures (at 526, FIG. 5) a RSTD or other signal parameter using the requested and received PRS, and then the UE sends a message (at 526, FIG. 5) to report the measured signal parameter, as part of a positioning procedure to allow a positioning entity to determine a position of the UE 410).

Example 2

The method of example 1, comprising controlling receiving, by the user device (UE 410, FIGS. 4-5) from the network node (e.g., gNB 510, FIGS. 4-6), at least one of the following: information associated with or addressed to (e.g., based on scrambling a CRC of the message using the identifier or RNTI) the identifier; information associated with or addressed to the identifier that indicates that a positioning reference signal request procedure is completed; or information indicating a configuration of the positioning reference signal.

Example 3

The method of any of examples 1-2, wherein the identifier comprises at least one of a radio network temporary identifier (RNTI) or an identifier (e.g., logical channel identifier (LCID) of a control message to indicate a request for a transmission of a positioning reference signal.

Example 4

The method of any of examples 1-3, wherein the selecting a downlink reference signal comprises: selecting, by the user device (e.g., UE 410, FIGS. 4-5), at least one of a synchronization signal block (SSB) (e.g., such as selecting SSB #0, FIG. 6), a channel state information-reference signal (CSI-RS), or other downlink reference signal, based on a received power (e.g., based on a RSRP) or other measured signal parameter of the downlink reference signal.

Example 5

The method of any of examples 1-4, wherein the controlling sending a random access preamble via a random access resource associated with the selected downlink reference signal comprises: determining, by the user device, that the user device is unable to receive a positioning reference signal (PRS) associated with the selected downlink reference signal (e.g., UE 410 may be unable to detect or receive a PRS using a same beam or receive configuration that the UE used to receive the selected DL RS, or the UE 410 has not yet received a configuration of the PRS and thus may be unable to receive the PRS for this reason); and controlling sending (e.g., by the UE 410) a random access preamble via a random access resource associated with the selected downlink reference signal (e.g., UE 410 sending a RACH preamble via msg. 1 of a RACH procedure, using a time/frequency resource associated with or assigned to the selected DL RS or beam of the selected DL RS). E.g., see operation 720, FIG. 7, as an example of determining that the user device is unable to detect or receive a PRS.

Example 6

The method of example 5, wherein the determining that the user device (e.g., UE 410, FIGS. 4-5) is unable to receive a positioning reference signal (e.g., ATRS #0 via beam 640, FIG. 6) associated with the selected downlink reference signal (e.g., associated with or transmitted via same beam 630 as a selected SSB #0 630, FIG. 6, e.g., e.g., where gNB transmit beams 630 and 640 may be the same gNB transmit beam (e.g., same beam width and/or beam direction); where UE may use a same receive beam to receive both SSB #0 and ATRS #0) comprises at least one of: determining, by the user device (UE 410), that the user device is unable to detect or receive a positioning reference signal (e.g., ATRS #0 via beam 640 FIG. 6) via use, by the user device, of a receive configuration and/or receive beam (e.g., receive ATRS #0 via beam 640 via a same UE receive beam that was used by the UE to received the selected DL RS SSB #0 via beam 630, FIG. 6) that is used by the user device to receive the selected downlink reference signal; or determining, by the user device (UE 410), that the user device has not received a configuration of a positioning reference signal associated with the selected downlink reference signal (e.g., UE 410 has not received a configuration of a PRS from gNB 510, such as via system information or SIB). E.g., see operation 720, FIG. 7 as an example of determining that the user device is unable to receive a PRS.

Example 7

The method of any of examples 1-6, further comprising: receiving, by the user device (e.g., UE 410) from the network node (e.g., gNB 510) in response to controlling sending the identifier (e.g., RNTI or other identifier), a message that includes a positioning reference signal configuration of the positioning reference signal, the positioning reference signal configuration including at least a time period that the positioning reference signal will be transmitted. E.g., operation 524 (FIG. 5) may include the UE 410 receiving a PRS signal configuration.

Example 8

The method of any of examples 1-7, wherein: the controlling sending the random access preamble via a random access resource associated with the selected downlink reference signal indicates a beam associated with the selected downlink reference signal; and the controlling sending the identifier indicates a request for transmission of a positioning reference signal via the indicated beam. For example, the UE 410 may send a RACH preamble via a resource associated with a selected SSB #0 (FIG. 6) to indicate the beam 630 of SSB #0 to gNB 510; and the controlling sending the identifier (e.g., RNTI to be used to request PRS transmission) indicates a request to gNB 510 for sending/transmission of a PRS via the indicated beam 630 of SSB #0, which would be a request for transmission of ATRS #0 via gNB transmit beam 640 that uses the same gNB transmit beam (e.g., gNB transmit beams 630 and 640 may be the same beam), and ATRS #0 can be received by the UE using the same UE receive beam or receive configuration that was used by UE 410 to receive the selected SSB #0, as shown in FIG. 6.

Example 9

The method of any of examples 1-8: wherein a quasi-colocation relationship exists between the selected downlink reference signal and the positioning reference signal such that the user device may use a same or common receive configuration to receive both the selected downlink reference signal and the positioning reference signal, wherein the common receive configuration includes one or more of: a doppler shift, a doppler spread, average delay, delay spread, and/or a spatial receive parameter or receive beam. For example, UE may receive a requested PRS (ATRS #0) using the same UE receive beam or UE receive configuration that was used by UE 410 to receive the selected SSB #0 (FIG. 6). Thus, for example, based on this quasi-colocation relationship, the gNB transmit beam 630 used by gNB 510 to transmit the selected SSB #0 may be the same beam as gNB transmit beam 640 used by gNB 510 to transmit the requested (and associated) ATRS #0. This quasi-colocation relationship of SSB #0 and ATRS #0 may allow, e.g., the UE 410 to receive both of these signals (the selected DL RS (SSB #0) and the requested PRS (ATRS #0) via a same UE receive beam and/or via a same UE receive configuration. Thus, in an example shown in FIG. 6, gNB transmit beams 630 and 640 may be the same beam or may be the same beam direction, e.g., which may allow UE 410 to receive both SSB #0 and ATRS #0 via a same receive beam or receive configuration (which may include a UE receive beam or spatial parameter/beam).

Example 10

The method of any of examples 1-9: wherein the determining, by the user device (e.g., UE 410, FIGS. 4-5), the identifier comprises receiving a radio network temporary identifier (RNTI) for positioning or for asset tracking that may be used within a random access procedure to request a transmission of a positioning reference signal.

Example 11

The method of example 10, wherein the identifier comprises at least one the following: an asset tracking-radio network temporary identifier (AT-RNTI); an inactive-radio network temporary identifier (I-RNTI); a paging radio network temporary identifier (P-RNTI); or a cell-radio network temporary identifier (C-RNTI).

Example 12

The method of any of examples 1-11, wherein the carrying out a positioning procedure using the requested positioning reference signal comprises: measuring, by the user device (e.g., UE 410) as part of the positioning procedure, a reference signal time difference (RSTD) based at least on the received positioning reference signal; and sending a message including the measured reference signal time difference. For example, a UE 410 (FIGS. 4-5) may carry out a positioning procedure (e.g., operation 250, FIG. 2) using the requested positioning reference signal (e.g., operation 526, where UE measures (at 526, FIG. 5) a RSTD or other signal parameter of the requested and received PRS (e.g., ATRS #0, received by the UE 410), and then the UE (e.g., UE 410) may send a message (at 526, FIG. 5) to report the measured signal parameter (e.g., RSTD or other parameter measured of the received PRS (e.g., RSTD measured based on received ATRS #0, FIGS. 4-6), as part of a positioning procedure to allow a positioning entity to determine a position of the UE 410).

Example 13

A non-transitory computer-readable storage medium (e.g., memory 1208, FIG. 8) comprising instructions stored thereon that, when executed by at least one processor (e.g., processor 1204, FIG. 8), are configured to cause a computing system to perform the method of any of examples 1-12.

Example 14

Figure 8:
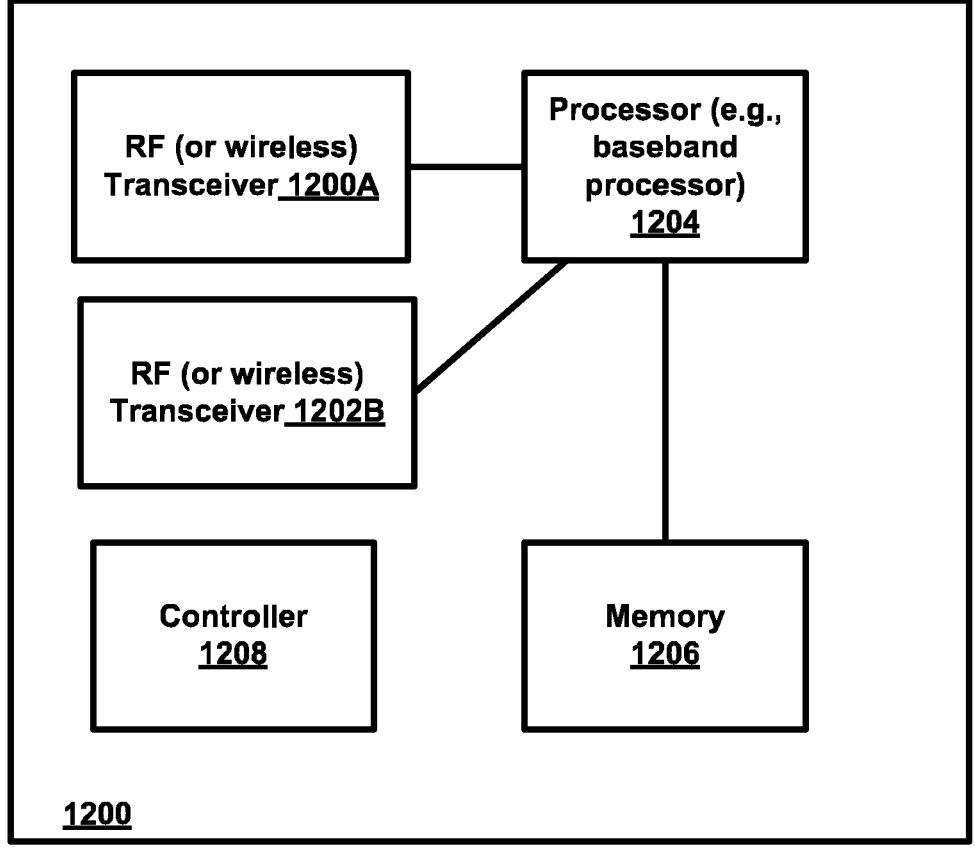
FIG. 8 is a block diagram of a wireless station or node (e.g., AP, BS, RAN node, DU UE or user device, or network node).

An apparatus (e.g., 1200, FIG. 8) comprising means (e.g., processor 1204, memory 1206 and/or transceiver 1200A, and/or 1200B, FIG. 8) for performing the method of any of examples 1-12.

Example 15

An apparatus (e.g., 1200, FIG. 8) comprising: at least one processor (processor 1204, FIG. 8); and at least one memory (memory 1204, FIG. 8) including computer program code; the at least one memory and the computer program code configured to, with the at least one processor, cause the apparatus at least to perform the method of any of examples 1-12.

Example 16. A Method Comprising

Controlling receiving (or receiving) (e.g., operation 310, FIG. 3), by a network node (e.g., gNB 510, FIGS. 4-5) from a user device (e.g., UE 410) as part of a random access procedure (e.g., within msg1), a random access preamble via a random access resource associated with a downlink reference signal (e.g., RACH preamble transmission, operation 510, FIG. 5; operation 730, FIG. 7) via a random access resource associated with the selected downlink reference signal (e.g., associated with a selected SSB #0, FIG. 6);

Controlling receiving (or receiving) (e.g., operation 320, FIG. 3), by the network node (e.g., gNB 510) from the user device (e.g., UE 410) as part of the random access procedure, an identifier that indicates a request for transmission of a positioning reference signal that is associated with the downlink reference signal (e.g., UE 410 transmits, and gNB 510 receives, within RACH msg3, a determined RNTI, or other identifier, to be used to request a PRS transmission from gNB 510; and/or operation 522 of FIG. 5 where UE 410 transmits, and gNB 510 receives, an identifier (e.g., RNTI); see also operation 740, FIG. 7). And, Controlling sending (or sending) (operation 330, FIG. 3), by the network node (e.g., gNB 510), the requested positioning reference signal (e.g., gNB may send to UE 410 may the requested PRS, such as ATRS #0, via beam 640 that is sent by gNB via same gNB transmit beam as selected SSB #0, beam 630, FIG. 6).

Example 17

The method of example 16, further comprising controlling sending by the network node (e.g., gNB 510, FIGS. 4-5) to the user device (e.g., UE 410), at least one of the following: information associated with or addressed to (e.g., based on scrambling a CRC of the message using the identifier or RNTI) the identifier; information associated with or addressed to the identifier that indicates that a positioning reference signal request procedure is completed; or information indicating a configuration of the positioning reference signal.

Example 18

The method of any of examples 16-17, wherein the identifier comprises at least one of a radio network temporary identifier (RNTI) or an identifier of a control message (e.g., logical channel identifier or LCID) to indicate a request for a transmission of a positioning reference signal.

Example 19

The method of any of examples 16-18, further comprising: controlling sending, by the network node (e.g., gNB 510) to the user device (e.g., UE 410), a message that includes a positioning reference signal configuration of the positioning reference signal, the positioning reference signal configuration including at least a time period that the positioning reference signal will be transmitted by the network node. E.g., operation 524 (FIG. 5) may include the gNB sending to UE 410 a PRS signal configuration.

Example 20

The method of any of examples 16-19, wherein: the controlling receiving the random access preamble via a random access resource associated with the selected downlink reference signal indicates a beam associated with the selected downlink reference signal; and the controlling receiving the identifier indicates a request, from the user device, for transmission of a positioning reference signal via the indicated beam. For example, the UE 410 may send, and gNB 510 may receive, a RACH preamble via a resource associated with a selected SSB #0 (FIG. 6) to indicate the beam 630 of SSB #0 to gNB 510; and the controlling receiving, by gNB 510, the identifier (e.g., RNTI to be used to request PRS transmission) indicates a request to gNB 510 to send/transmit a PRS via the indicated beam 630 of SSB #0, which would be a request for transmission of ATRS #0 via gNB transmit beam 640 (or 630) that uses the same gNB transmit beam (e.g., gNB transmit beams 630 and 640 may be the same beam.

Example 21

The method of any of examples 16-20: wherein a quasi-colocation relationship exists between the selected downlink reference signal and the positioning reference signal such that the user device may use a same or common receive configuration to receive both the selected downlink reference signal and the positioning reference signal, wherein the common receive configuration includes one or more of: a doppler shift, a doppler spread, average delay, delay spread, and/or a spatial receive parameter or receive beam. For example, gNB may send, and UE may receive, a requested PRS (e.g., ATRS #0, FIG. 6) using the same gNB transmit beam that the gNB used to transmit the associated DL RS (e.g., SSB #0, FIG. 6). This quasi-colocation relationship of SSB #0 and ATRS #0 may allow, for example, the UE 410 to receive both of these signals (the selected DL RS (SSB #0) and the requested PRS (ATRS #0) via a same UE receive beam and/or via a same UE receive configuration.

Example 22

The method of any of examples 16-21: wherein the identifier comprises one of an asset tracking-radio network temporary identifier (AT-RNTI), an inactive-radio network temporary identifier (I-RNTI), a paging radio network temporary identifier (P-RNTI) or a cell-radio network temporary identifier (C-RNTI).

Example 23

A non-transitory computer-readable storage medium (e.g., memory 1208, FIG. 8) comprising instructions stored thereon that, when executed by at least one processor (e.g., processor 1204, FIG. 8), are configured to cause a computing system to perform the method of any of examples 16-22.

Example 24

An apparatus (e.g., 1200, FIG. 8) comprising means (e.g., processor 1204, memory 1206 and/or transceiver 1200A, and/or 1200B, FIG. 8) for performing the method of any of examples 16-22.

Example 25

An apparatus (e.g., 1200, FIG. 8) comprising: at least one processor (processor 1204, FIG. 8); and at least one memory (memory 1204, FIG. 8) including computer program code; the at least one memory and the computer program code configured to, with the at least one processor, cause the apparatus at least to perform the method of any of examples 16-22.

Example 26

The apparatus of any of examples 16-25, wherein the network node comprises at least one of: a gNB (e.g., gNB 510); a Transmission/Reception Point (TRP) or points; an eNB; a gNB-distributed unit (gNB-DU); or a base station (BS).

FIG. 8 is a block diagram of a wireless station (e.g., AP, BS or user device/UE, or other network node) 1200 according to an example embodiment. The wireless station 1200 may include, for example, one or more (e.g., two as shown in FIG. 8) RF (radio frequency) or wireless transceivers 1202A, 1202B, where each wireless transceiver includes a transmitter to transmit signals and a receiver to receive signals. The wireless station also includes a processor or control unit/entity (controller) 1204 to execute instructions or software and control transmission and receptions of signals, and a memory 1206 to store data and/or instructions.

Processor 1204 may also make decisions or determinations, generate frames, packets or messages for transmission, decode received frames or messages for further processing, and other tasks or functions described herein. Processor 1204, which may be a baseband processor, for example, may generate messages, packets, frames or other signals for transmission via wireless transceiver 1202 (1202A or 1202B). Processor 1204 may control transmission of signals or messages over a wireless network, and may control the reception of signals or messages, etc., via a wireless network (e.g., after being down-converted by wireless transceiver 1202, for example). Processor 1204 may be programmable and capable of executing software or other instructions stored in memory or on other computer media to perform the various tasks and functions described above, such as one or more of the tasks or methods described above. Processor 1204 may be (or may include), for example, hardware, programmable logic, a programmable processor that executes software or firmware, and/or any combination of these. Using other terminology, processor 1204 and transceiver 1202 together may be considered as a wireless transmitter/receiver system, for example.

In addition, referring to FIG. 8, a controller (or processor) 1208 may execute software and instructions, and may provide overall control for the station 1200, and may provide control for other systems not shown in FIG. 8, such as controlling input/output devices (e.g., display, keypad), and/or may execute software for one or more applications that may be provided on wireless station 1200, such as, for example, an email program, audio/video applications, a word processor, a Voice over IP application, or other application or software.

In addition, a storage medium may be provided that includes stored instructions, which when executed by a controller or processor may result in the processor 1204, or other controller or processor, performing one or more of the functions or tasks described above.

According to another example embodiment, RF or wireless transceiver(s) 1202A/1202B may receive signals or data and/or transmit or send signals or data. Processor 1204 (and possibly transceivers 1202A/1202B) may control the RF or wireless transceiver 1202A or 1202B to receive, send, broadcast or transmit signals or data.

The embodiments are not, however, restricted to the system that is given as an example, but a person skilled in the art may apply the solution to other communication systems. Another example of a suitable communications system is the 5G concept. It is assumed that network architecture in 5G will be quite similar to that of the LTE-advanced. 5G is likely to use multiple input—multiple output (MIMO) antennas, many more base stations or nodes than the LTE (a so-called small cell concept), including macro sites operating in co-operation with smaller stations and perhaps also employing a variety of radio technologies for better coverage and enhanced data rates.

It should be appreciated that future networks will most probably utilise network functions virtualization (NFV) which is a network architecture concept that proposes virtualizing network node functions into "building blocks" or entities that may be operationally connected or linked together to provide services. A virtualized network function (VNF) may comprise one or more virtual machines running computer program codes using standard or general type servers instead of customized hardware. Cloud computing or data storage may also be utilized. In radio communications this may mean node operations may be carried out, at least partly, in a server, host or node operationally coupled to a remote radio head. It is also possible that node operations will be distributed among a plurality of servers, nodes or hosts. It should also be understood that the distribution of labour between core network operations and base station operations may differ from that of the LTE or even be non-existent.

Embodiments of the various techniques described herein may be implemented in digital electronic circuitry, or in computer hardware, firmware, software, or in combinations of them. Embodiments may be implemented as a computer program product, i.e., a computer program tangibly embodied in an information carrier, e.g., in a machine-readable storage device or in a propagated signal, for execution by, or to control the operation of, a data processing apparatus, e.g., a programmable processor, a computer, or multiple computers. Embodiments may also be provided on a computer readable medium or computer readable storage medium, which may be a non-transitory medium. Embodiments of the various techniques may also include embodiments provided via transitory signals or media, and/or programs and/or software embodiments that are downloadable via the Internet or other network(s), either wired networks and/or wireless networks. In addition, embodiments may be provided via machine type communications (MTC), and also via an Internet of Things (JOT).

The computer program may be in source code form, object code form, or in some intermediate form, and it may be stored in some sort of carrier, distribution medium, or computer readable medium, which may be any entity or device capable of carrying the program. Such carriers include a record medium, computer memory, read-only memory, photoelectrical and/or electrical carrier signal, telecommunications signal, and software distribution package, for example. Depending on the processing power needed, the computer program may be executed in a single electronic digital computer or it may be distributed amongst a number of computers.

Furthermore, embodiments of the various techniques described herein may use a cyber-physical system (CPS) (a system of collaborating computational elements controlling physical entities). CPS may enable the embodiment and exploitation of massive amounts of interconnected ICT devices (sensors, actuators, processors microcontrollers, . . . ) embedded in physical objects at different locations. Mobile cyber physical systems, in which the physical system in question has inherent mobility, are a subcategory of cyber-physical systems. Examples of mobile physical systems include mobile robotics and electronics transported by humans or animals. The rise in popularity of smartphones has increased interest in the area of mobile cyber-physical systems. Therefore, various embodiments of techniques described herein may be provided via one or more of these technologies.

A computer program, such as the computer program(s) described above, can be written in any form of programming language, including compiled or interpreted languages, and can be deployed in any form, including as a stand-alone program or as a module, component, subroutine, or other unit or part of it suitable for use in a computing environment. A computer program can be deployed to be executed on one computer or on multiple computers at one site or distributed across multiple sites and interconnected by a communication network.

Method steps may be performed by one or more programmable processors executing a computer program or computer program portions to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer, chip or chipset. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in, special purpose logic circuitry.

To provide for interaction with a user, embodiments may be implemented on a computer having a display device, e.g., a cathode ray tube (CRT) or liquid crystal display (LCD) monitor, for displaying information to the user and a user interface, such as a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments may be implemented in a computing system that includes a back-end component, e.g., as a data server, or that includes a middleware component, e.g., an application server, or that includes a front-end component, e.g., a client computer having a graphical user interface or a Web browser through which a user can interact with an embodiment, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described embodiments have been illustrated as described herein, many modifications, substitutions, changes and equivalents will now occur to those skilled in the art. It is, therefore, to be understood that the appended claims are intended to cover all such modifications and changes as fall within the true spirit of the various embodiments.

What is claimed is:

1. A method comprising:

determining, by a user device, an identifier to be used in a random access procedure to indicate a request for a positioning reference signal;

selecting, by the user device, a downlink reference signal among a plurality of downlink reference signals received from a network node;

controlling sending, by the user device to the network node, as part of a random access procedure, a random access preamble via a random access resource associated with the selected downlink reference signal, and the determined identifier;

controlling receiving, by the user device from the network node, the requested positioning reference signal; and carrying out a positioning procedure using the requested positioning reference signal, wherein the identifier comprises a radio network temporary identifier and an identifier of a control message to indicate a request for a transmission of a positioning reference signal, wherein the selecting a downlink reference signal comprises:

selecting, by the user device, a synchronization signal block, a channel state information-reference signal, and other downlink reference signal, based on a received power or other measured signal parameter of the downlink reference signal.

2. The method of claim 1, wherein a quasi-colocation relationship exists between the selected downlink reference signal and the positioning reference signal such that the user device may use a same or common receive configuration to receive both the selected downlink reference signal and the positioning reference signal, wherein the common receive configuration includes one or more of: a doppler shift, a doppler spread, average delay, delay spread, and/or a spatial receive parameter or receive beam.

3. The method of claim 1, further comprising controlling receiving, by the user device from the network node, the following:

information associated with or addressed to the identifier;

information associated with or addressed to the identifier that indicates that a positioning reference signal request procedure is completed; and information indicating a configuration of the positioning reference signal.

4. The method of claim 1, wherein the controlling sending a random access preamble via a random access resource associated with the selected downlink reference signal comprises:

determining, by the user device, that the user device is unable to receive a positioning reference signal associated with the selected downlink reference signal; and controlling sending a random access preamble via a random access resource associated with the selected downlink reference signal.

5. The method of claim 1, wherein:

the controlling sending the random access preamble via a random access resource associated with the selected downlink reference signal indicates a beam associated with the selected downlink reference signal; and the controlling sending the identifier indicates a request for transmission of a positioning reference signal via the indicated beam.

6. The method of claim 1, wherein the carrying out a positioning procedure using the requested positioning reference signal comprises:

measuring, by the user device as part of the positioning procedure, a reference signal time difference (RSTD) based at least on the received positioning reference signal; and sending a message including the measured reference signal time difference, and wherein the identifier further comprises the following:

an asset tracking-radio network temporary identifier (AT-RNTI);

an inactive-radio network temporary identifier (1-RNTI);

a paging radio network temporary identifier (P-RNTI); and a cell-radio network temporary identifier (C-RNTI).

7. An apparatus comprising:

at least one processor; and at least one memory including computer program code;

the at least one memory and the computer program code configured to, with the at least one processor, cause the apparatus at least to:

determine, by a user device, an identifier to be used in a random access procedure to indicate a request for a positioning reference signal;

select, by the user device, a downlink reference signal among a plurality of downlink reference signals received from a network node;

control sending, by the user device to the network node, as part of a random access procedure, a random access preamble via a random access resource associated with the selected downlink reference signal, and the determined identifier;

control receiving, by the user device from the network node, the requested positioning reference signal; and carry out a positioning procedure using the requested positioning reference signal, wherein the identifier comprises a radio network temporary identifier and an identifier of a control message to indicate a request for a transmission of a positioning reference signal, wherein the selecting a downlink reference signal comprises:

selecting, by the user device, a synchronization signal block, a channel state information-reference signal, and other downlink reference signal, based on a received power or other measured signal parameter of the downlink reference signal.

8. A method comprising:

controlling receiving, by a network node from a user device as part of a random access procedure, a random access preamble via a random access resource associated with a downlink reference signal;

controlling receiving, by the network node from the user device as part of the random access procedure, an identifier that indicates a request for transmission of a positioning reference signal that is associated with the downlink reference signal; and controlling sending, by the network node, the requested positioning reference signal, the method further comprising controlling sending by the network node to the user device, the following:

information associated with or addressed to the identifier:

information associated with or addressed to the identifier that indicates that a positioning reference signal request procedure is completed; and information indicating a configuration of the positioning reference signal, wherein the identifier comprises a radio network temporary identifier and an identifier of a control message to indicate a request for a transmission of a positioning reference signal.

9. The method of claim 8, further comprising: controlling sending, by the network node to the user device, a message that includes a positioning reference signal configuration of the positioning reference signal, the positioning reference signal configuration including at least a time period that the positioning reference signal will be transmitted by the network node.

10. The method of claim 9, wherein:

the controlling receiving the random access preamble via a random access resource associated with the selected downlink reference signal indicates a beam associated with the selected downlink reference signal; and the controlling receiving the identifier indicates a request, from the user device, for transmission of a positioning reference signal via the indicated beam.

11. An apparatus comprising:

at least one processor; and at least one memory including computer program code;

the at least one memory and the computer program code configured to, with the at least one processor, cause the apparatus at least to:

control receiving, by a network node from a user device as part of a random access procedure, a random access preamble via a random access resource associated with a downlink reference signal;

control receiving, by the network node from the user device as part of the random access procedure, an identifier that indicates a request for transmission of a positioning reference signal that is associated with the downlink reference signal; and control sending, by the network node, the requested positioning reference signal, the at least one memory and the computer program code further configured to, with the at least one processor, cause the apparatus at least to:

control sending by the network node to the user device, the following:

information associated with or addressed to the identifier:

information associated with or addressed to the identifier that indicates that a positioning reference signal request procedure is completed; and information indicating a configuration of the positioning reference signal, wherein the identifier comprises a radio network temporary identifier and an identifier of a control message to indicate a request for a transmission of a positioning reference signal.

12. The apparatus of claim 7, wherein the controlling sending a random access preamble via a random access resource associated with the selected downlink reference signal further comprises:

determining, by the user device, that the user device is unable to receive a positioning reference signal associated with the selected downlink reference signal; and controlling sending a random access preamble via a random access resource associated with the selected downlink reference signal.

13. The apparatus of claim 7, the apparatus being further configured to:

determine, by the user device, that the user device is unable to receive a positioning reference signal associated with the selected downlink reference signal; and control sending a random access preamble via a random access resource associated with the selected downlink reference signal.

14. The apparatus of claim 7, wherein:

the controlling sending the random access preamble via a random access resource associated with the selected downlink reference signal indicates a beam associated with the selected downlink reference signal; and the controlling sending the identifier indicates a request for transmission of a positioning reference signal via the indicated beam.

15. The apparatus of claim 7, wherein the carrying out a positioning procedure using the requested positioning reference signal comprises:

measuring, by the user device as part of the positioning procedure, a reference signal time difference (RSTD) based at least on the received positioning reference signal; and sending a message including the measured reference signal time difference.

16. The apparatus of claim 11, further comprising causing the apparatus to:

control sending, by the network node to the user device, a message that includes a positioning reference signal configuration of the positioning reference signal, the positioning reference signal configuration including at least a time period that the positioning reference signal will be transmitted by the network node.

17. The apparatus of claim 11, wherein:

the controlling receiving the random access preamble via a random access resource associated with the selected downlink reference signal indicates a beam associated with the selected downlink reference signal; and the controlling receiving the identifier indicates a request, from the user device, for transmission of a positioning reference signal via the indicated beam.

* * * * *